United States Patent
Gordon

(10) Patent No.: US 11,074,173 B1
(45) Date of Patent: Jul. 27, 2021

(54) METHOD AND SYSTEM TO DETERMINE AN OPTIMAL OVER-PROVISIONING RATIO

(71) Applicant: LIGHTBITS LABS LTD., Kfar Saba (IL)

(72) Inventor: Abel Alkon Gordon, Haifa (IL)

(73) Assignee: Lightbits Labs Ltd., Kfar Saba (IL)

( * ) Notice: Subject to any disclaimer, the term of this patent is extended or adjusted under 35 U.S.C. 154(b) by 0 days.

(21) Appl. No.: 16/449,610

(22) Filed: Jun. 24, 2019

Related U.S. Application Data

(63) Continuation-in-part of application No. 16/014,004, filed on Jun. 21, 2018, now Pat. No. 10,628,301, and a continuation-in-part of application No. 15/963,131, filed on Apr. 26, 2018, now Pat. No. 10,713,162, and a continuation-in-part of application No. 16/429,304, filed on Jun. 3, 2019.

(51) Int. Cl.
*G06F 12/02* (2006.01)
*G06F 3/06* (2006.01)
*G06K 9/62* (2006.01)
*G06N 20/00* (2019.01)

(52) U.S. Cl.
CPC ........ *G06F 12/0246* (2013.01); *G06F 3/0611* (2013.01); *G06F 3/0631* (2013.01); *G06F 3/0679* (2013.01); *G06K 9/6256* (2013.01); *G06N 20/00* (2019.01)

(58) Field of Classification Search
CPC . G06F 12/0253; G06F 3/0679; G06F 12/0246
USPC ....................................................... 711/103
See application file for complete search history.

(56) References Cited

U.S. PATENT DOCUMENTS

| | | | |
|---|---|---|---|
| 10,417,243 B1 | 9/2019 | Singh et al. | |
| 10,812,319 B1 | 10/2020 | Prakash et al. | |
| 2012/0272132 A1 | 10/2012 | Mondal et al. | |
| 2014/0136575 A1 | 5/2014 | Zhao et al. | |
| 2014/0372490 A1 | 12/2014 | Barrus et al. | |
| 2016/0313922 A1* | 10/2016 | Kojima | G06F 3/0616 |
| 2016/0350213 A1* | 12/2016 | Patil | G06F 3/0604 |
| 2016/0380977 A1 | 12/2016 | Bean et al. | |
| 2017/0054824 A1 | 2/2017 | Friedman et al. | |

(Continued)

OTHER PUBLICATIONS

U.S. Office Action U.S. Appl. No. 16/014,004 dated Aug. 5, 2019.
(Continued)

*Primary Examiner* — Than Nguyen
(74) *Attorney, Agent, or Firm* — Pearl Cohen Zedek Latzer Baratz LLP

(57) ABSTRACT

A system and a method of managing over-provisioning (OP) on non-volatile memory (NVM) computer storage media including at least one NVM storage device, by at least one processor, may include: receiving a value of one or more run-time performance parameters pertaining to data access requests to one or more physical block addresses (PBAs) of the storage media; receiving at least one of a target performance parameter value and a system-inherent parameter value; analyzing the received at least one run-time performance parameter value, to determine an optimal OP ratio of at least one NVM storage device in view of the received at least of a target performance parameter value and system-inherent parameter value; and limiting storage of data objects on the at least one NVM storage device according to the determined OP ratio.

22 Claims, 13 Drawing Sheets

(56) References Cited

U.S. PATENT DOCUMENTS

| | | | |
|---|---|---|---|
| 2017/0153848 A1 | 6/2017 | Martineau et al. | |
| 2017/0187533 A1 | 6/2017 | Raj et al. | |
| 2018/0364924 A1* | 12/2018 | Fukutomi | G06F 11/07 |
| 2020/0133840 A1* | 4/2020 | Zhou | G06F 3/0631 |

OTHER PUBLICATIONS

U.S. Office Action U.S. Appl. No. 16/429,304 dated May 27, 2020.
Notice of Allowance for U.S. Appl. No. 16/429,304 dated May 14, 2021.

* cited by examiner

METHOD AND SYSTEM TO DETERMINE AN OPTIMAL OVER-PROVISIONING RATIO

RELATED APPLICATION DATA

The present application is a continuation-in-part (CIP) of the following prior US applications:

Ser. No. 16/014,004 filed on Jun. 21, 2018, entitled "SYSTEM AND METHOD FOR OPTIMIZING WRITE AMPLIFICATION OF NON-VOLATILE MEMORY STORAGE MEDIA";

Ser. No. 15/963,131 filed on Apr. 26, 2018, entitled "SYSTEM AND METHOD FOR COMPUTER DATA GARBAGE COLLECTION ACCELERATION USING PEER TO PEER DATA TRANSFERS"; and Ser. No.

Ser. No. 16/429,304 filed on Jun. 3, 2019, entitled "SYSTEM AND METHOD FOR OPTIMIZING WRITE AMPLIFICATION OF NON-VOLATILE MEMORY STORAGE MEDIA", all incorporated herein by reference in their entirety.

FIELD OF THE INVENTION

The present invention relates generally to non-volatile storage systems. More specifically, the present invention relates to management of data storage on non-volatile memory devices.

BACKGROUND OF THE INVENTION

Non-volatile memory (NVM) devices, such as flash memory devices and solid-state drives (SSDs) have become ubiquitous in a variety of computerized applications. The inherent speed of data fetching from NMV devices, as well as the lack of moving mechanical parts and relatively small aspect ratio have made these devices a preferable selection to hard-disk storage systems, in applications ranging from Internet-of-Things (IoT) devices to cloud-based servers.

The internal storage of NVM devices is divided into blocks, also known as "erase blocks", which are further divided into equally-sized pages, so that each block is a collection of pages. Blocks are defined as the smallest units that can be erased, whereas pages are defined as the smallest units that can be written.

In order to reuse (e.g.: re-write) a page, all the pages belonging to the same block must be erased. Thus, flash devices always write new data into free pages, that have been previously erased, even if a previous version of the data has been written in a different page. When this happens, the page holding the old data becomes invalid, but cannot be re-used until the block holding it is erased in its entirety. The number of times a block can be erased is limited and affects the endurance of the flash device (e.g., the NVM device's life expectancy).

Flash devices have an internal garbage-collection (GC) mechanism, responsible for reclaiming invalid pages. The internal GC mechanism scans for candidate blocks to be reclaimed (e.g., blocks that have more invalid pages than valid pages). The valid pages of candidate blocks are read and copied to a new block. Finally, the GC mechanism erases the whole block and labels or marks it as free, so it could be re-used for future writes.

When a host computer writes a data object to an NVM device, it may specify a desired location for the data using a virtual address in an application address space. The virtual address may, for example include a namespace, which can be thought of as a virtual hard drive, and a virtual user block address (UBA), which is an offset from the namespace within the application address space. The NVM device may store the data object in any physical address within the NVM and may also move the data location as a result of GC activity. The NVM implements a translation layer to maintain the association of each data object's application address with the physical address on the NVM device.

Write operations can be divided into two classes: writes generated by the internal GC mechanism and writes generated by the external host computer. The total number of concurrent writes a device can handle is limited, thus it is desirable to minimize the number of write operations generated by the internal GC process so that the flash device will be able to handle more external host write operations. Moreover, reducing the number of GC writes directly reduces the number of required erasure cycles (also known as program-erase (PE) cycles), thus improving the lifetime and endurance of the NVM device.

The write amplification (WA) parameter is a metric used to measure the relation between external write operations and CC write operations, and is defined in the following equation Eq. 1:

$$WA = (\text{External-Writes} + GC\text{-Writes})/(\text{External-Writes}). \quad \text{Eq. 1}$$

It is desired to keep the WA as low as possible. For example: when WA is equal to 1 (optimal value), there are no GC write operations.

NVM devices use fixed-size user data blocks, and applications are forced to use this user data-block size to store data. Applications that require management of data that is not aligned with an integer product of the user data block size (e.g., file system, database, compressed block device, key/value storage) need to implement their own translation layer and GC mechanism. For example, a key/value application that writes objects of variable sizes, needs to know the virtual user block address (UBA) wherein each data object is stored. If data objects are not aligned to the virtual user data block size, the key/value application will need to reclaim invalid space.

The translation layer and GC mechanism of the application works in parallel to the translation layer and internal GC mechanism of the NVM device, resulting in a non-cooperative duplicated process that increases the WA of the overall system, reduces the performance and shortens the life-span of the NVM device.

As known in the art, NVM devices such as Flash memory devices include a reserved memory space that is not exposed to the user. The ratio between the total memory space (i.e., the reserved space and the user-accessible space) and the user-accessible space is commonly referred to as the over provision (OP) ratio.

The OP ratio may manifest a tradeoff between the available storage space that a user may utilize on the storage system and one or more performance parameters of the storage system. Setting a large OP ratio may dictate that a user and/or application associated with the storage system may only utilize a limited portion of the storage space but may also dictate that a large percentage or portion of the storage space may be reserved for the storage system's GC process. As known in the art, reservation of a large portion of storage space may incur a small WA percentage, resulting in improved system endurance (as the system is limited by the maximal number of program/Erase cycles). Reservation of a large portion of storage space may also positively affect performance parameters of the storage system and may, for example, decrease average and/or tail storage access latencies (e.g., latency of read and/or write storage access requests).

As known in the art, known mathematical models exist for estimation of WA as a function of the OP for random write workloads. This function may not be linear and may vary according to the write pattern. For example, as a randomness or an entropy of data write accesses may increases, the storage system's WA and average and/or tail data access latency may subsequently also increase. State-of-the-art data storage systems may be configured to reserve a minimal memory space so as to accommodate predefined target WA and performance parameters.

In other words, given a required quality of service (QoS) target (e.g., a maximal WA, a maximal average read latency, a maximal tail read latency, a maximal average write latency, a maximal tail write latency and the like), a person skilled in the art may employ such a known mathematical model to estimate a minimal OP ratio required in order to accommodate the required QoS target (e.g., an OP that may correspond to a maximal WA ratio).

State-of-the-art data storage systems may be configured to reserve a minimal portion of the underlying memory space to accommodate a minimal predefined OP ratio that may, in turn, support a required target QoS parameter (e.g., a maximal WA ratio). Commercially available storage systems may be adapted to increase the OP ratio by limiting, by either software or hardware, the memory space that is exposed for storage and/or retrieval of data. However, in conditions at which storage system workloads and storage access patterns may be dynamic, it may be difficult or even impossible to estimate in advance an OP ratio that may be required so as to accommodate such predefined, required target QoS or performance parameters.

SUMMARY

A system and/or a method for management of over-provisioning (OP) that may provide adjustable, dynamic, minimal storage OP in real time or in near-real time is therefore desired. Embodiments of the present invention may combine management of a garbage collection (GC) process of a storage system (e.g., an NVM media and/or NVM device) with the management of OP, and may thus provide adjustable, thin, dynamic storage over provisioning in real time or in near-real time, as elaborated herein.

Embodiments of the present invention may provide an OP management process that may be minimal in a sense that it may allow a minimal margin of reserved storage space that would accommodate predefined target QoS performance parameters. This may be opposed to common practice in commercially available storage systems, where an overhead, large storage space may be reserved to accommodate the required predefined target QoS performance parameter values, but may subsequently limit the utilization of memory on the storage media and may increase the price of storage per the amount of accessible memory space.

Embodiments of the present invention may provide an OP management process that may be adjustable in a sense that embodiments may allow a user (e.g., a human administrator and/or a software process) to define one or more requirements for target performance parameters and set the OP ratio accordingly.

Embodiments of the present invention may provide an OP management process that may be dynamic, in real time or in near-real time, in a sense that embodiments may employ the GC mechanism to analyze one or more performance parameters (e.g., WA ratio, storage access latency, etc.) in real time or in near-real time, and adjust the portion of reserved memory space (and hence the OP), so as to accommodate the required target performance parameters' values (e.g., have an actual, run-time WA ratio that may be capped by a target, maximal WA value).

Embodiments of the present invention may provide a system and a method for combining the management of the GC mechanisms and translation layers, of both the NVM device and application, that would enable storage of variable-sized objects (e.g., compressed data blocks or key/value objects) to be stored in flash media while minimizing the overall WA of the system is therefore desired.

Embodiments may manage non-volatile memory (NVM) computer storage media may include at least one NVM storage device, by at least one processor by for example:
   a. setting a write pointer to point to a write unit (WV) having a logical address space;
   b. receiving at least one data object, having a user block address (UBA);
   c. mapping the UBA to a logical block address (LBA) within the WU pointed by the write pointer;
   d. repeating steps b and c until the address space of the WU is full;
   e. storing the content of the WU in at least one physical block address (PBA) of the NVM storage media;
   f. updating the write pointer to point to a next WU; and
   g. repeating steps b thru f with the next WU.

Embodiments may continue (e.g. perpetually) at least as long as data objects are received and are required to be stored in a physical address of the NVM storage media.

According to some embodiments, mapping the UBA to an LBA may include: updating the mapping between the UBA and the respective LBA in a translation table; and updating a status of validity of the LBA to one of 'valid' and 'invalid' in a metadata table.

In some embodiments, setting a write pointer to point to a WU having a logical address space may include:
   allocating a logical address space may include a plurality of logical blocks, wherein each logical block refers to a physical data block of the NVM storage media; and
   dividing the allocated logical address space into a plurality of WUs, wherein each WU has a fixed-sized portion of the allocated logical address space, and wherein each WU represents a fixed-sized portion of a plurality of data-pages on the NVM storage media.

In some embodiments, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

Embodiments may further include:
   setting a garbage collection (GC) pointer to point to a WU of the allocated logical address space that is located ahead of the WU pointed by the write pointer
   performing GC on the WU pointed by the GC pointer; and
   updating the GC pointer to point to a next WU.

In some embodiments, the GC pointer may be a cyclic pointer, and updating the GC pointer may include incrementing the GC pointer value sequentially, to point to a next WU, from the first WU of the allocated logical address space to the last WU of the allocated logical address space and wrap around back to the first WU of the allocated logical address space.

Performing garbage collection on the WU pointed by the cyclic GC pointer may include:
  reading valid content of at least one page in the WU pointed by the GC pointer;
  marking or labelling the at least one page in the WU pointed by the GC pointer as invalid;
  writing the content into at least one page in the WU pointed by the write pointer; and
  marking the at least one page in the WU pointed by the write pointer as valid.

Embodiments may further include:
  receiving at least one value of at least one parameter, wherein said parameter is selected from a list consisting of: size of data objects, frequency of data write requests, size of WUs and required write amplification (WA) value; and
  incrementing the cyclic GC pointer according to the value of the cyclic write pointer and according to the at least one received value.

Embodiments may further include:
  analyzing the data in the metadata table, to obtain a parameter of occupancy for each WU;
  marking WUs in which the occupancy is above a predefined occupancy threshold as occupied;
  if the GC pointer points to a non-occupied WU, then performing GC and incrementing the GC pointer to the next WU;
  if the GC pointer points to an occupied WU, then incrementing the GC pointer without performing GC on the occupied WU;
  if the write pointer points to a non-occupied WU, then mapping UBA of received data objects to at least one LBA within the WU until the WU is full, and then incrementing the write pointer to the next WU; and
  if the write pointer points to an occupied WU, then incrementing the write pointer to the next WU, without mapping UBA of received data objects to the occupied WU.

Embodiments may further include:
  receiving a percentage of WUs, that are to be kept for over-provisioning;
  marking at least one WU as reserved for over-provisioning, according to the predefined percentage;
  if the GC pointer points to a non-reserved WU, then performing GC and incrementing the GC pointer to the next WU;
  if the GC pointer points to a reserved. WU, then incrementing the GC pointer, to point to the next WU without performing GC on the reserved WU;
  if the write pointer points to a non-reserved WU, then mapping UBA of received data objects to at least one LBA within the WU until the W U is full, and then incrementing the write pointer to the next WU; and
  if the write pointer points to a reserved WU, then incrementing the write pointer to point to the next WU without mapping UBA of received data objects to the occupied WU, to increase the over-provisioning of the NVM media.

Embodiments may further include:
  receiving a required level of WA;
  analyzing the data in the metadata table, to obtain a parameter of occupancy for each WU;
  marking, by the processor, WUs in which the occupancy is above a predefined occupancy threshold as occupied;
  determining the actual, run-time WA according to at least one of: the number of occupied WUs, the number of reserved WUs, and a distance between the write pointer and the GC pointer; and
  dynamically adjusting the percentage of WUs, that are to be reserved for over-provisioning, to adjust the over-provisioning of the NVM media, and to accommodate the required level of WA.

Embodiments may further provide a system for managing NVM computer storage media including at least one NVM storage device. Embodiments may include a non-transitory computer memory device upon which modules of computer instruction code are stored and a processor associated with the non-transitory computer memory device and configured to execute the modules of computer instruction code. The processor may be configured, upon execution of the computer instruction code, to:
  a. set a write pointer to point to a write unit (WU) having a logical address space;
  b. receive at least one data object, having a user block address (UBA);
  c. map the UBA to a logical block address (LBA) within the write unit (WU) pointed by the write pointer;
  d. repeat steps b and c until the address space of the WU is full;
  e. store the content of the WU in at least one physical block address (PBA)
  f. update the write pointer to point to a next WU; and
  g. repeat steps b thru f with the next WU.

Embodiments may further provide method of managing NVM computer storage media may include at least one NVM storage device, by at least one processor, the method including:
  causing a first pointer to reference a WU having a logical address space;
  receiving a data object having a UBA, mapping the UBA to an LBA within the WU referenced by the pointer, and repeating the receiving and mapping operations until the address space of the WU is filled;
  saving the data in the WU in at least one PBA of the NVM media;
  updating the pointer to point to a next WU; and
  performing the receiving and mapping repetition, and the saving operation for a subsequent WU.

Embodiments of the invention may include a system and a method of managing, by at least one processor, over-provisioning (OP) on NVM computer storage media, that may include at least one NVM storage device.

Embodiments of the method may include:
  receiving a value of one or more run-time performance parameters pertaining to data access requests to one or more physical block addresses (PB As) of the storage media;
  receiving at least one of a target performance parameter value and a system-inherent parameter value;
  analyzing the received at least one run-time performance parameter value, to determine an optimal OP ratio of at least one NVM storage device in view of the received at least of a target performance parameter value and system-inherent parameter value; and
  limiting storage of data objects on the at least one NVM storage device according to the determined OP ratio.

According to some embodiments, analyzing the received at least one run-time performance parameter value may include:
  accumulating a plurality of values of the one or more run-time performance parameters over time; and determining an optimal OP ratio of at least one NVM storage device according to the accumulated plurality of run-time performance parameter values.

Analysis of the received at least one run-time performance parameter value may be performed repeatedly, so as to obtain a timewise dynamic, optimal OP ratio value, in view of at least one change in at least one of a target performance parameter value and a run-time performance parameter value.

The value of at least one run-time performance parameter may be, for example: a write amplification (WA) ratio, a sequential write ratio, a read average latency, a read tail latency, a write average latency, a write tail latency, a data reduction ratio, a frequency of read access requests, a frequency of write access requests, a read to write ratio, a throughput to load ratio and the like.

The value of at least one target performance parameter may be, for example: a minimal expected read access rate, a minimal expected write access rate, a maximal target average read latency, a maximal target tail read latency, a maximal target average write latency, a maximal target write tail latency, a maximal target WA ratio, a minimal target endurance for at least one NVM device, a maximal target average read latency for at least one data volume, a maximal target tail read latency for at least one data volume, a maximal target average write latency for at least one data volume, a maximal target tail write latency for at least one data volume and the like.

According to some embodiments of the invention, analyzing the received at least one run-time performance parameter value may include:
providing the received at least one performance parameter value as a first data input to an optimization model;
providing at least one of a target parameter value and a system-inherent parameter value as a second data input to the optimization model; and
obtaining from the optimization model the optimal OP ratio of the least one NVM storage device.

The optimization model may, for example, be a machine-learning (ML) model that may be trained to produce an optimal OP ratio of the at least one NVM storage device in view of at least one of the target parameter value and the system-inherent parameter value.

Alternatively, or additionally, the optimization model may be a feedback control module. The feedback control module may be adapted to receive the at least one performance parameter value as feedback input and produce an optimal OP ratio of the at least one NVM storage device based on at least one of:
the received target parameter value;
the system-inherent parameter value; and
the feedback input.

According to some embodiments of the invention, receiving a value of the run-time WA ratio may include calculating the run-time WA ratio in real time, as part of a garbage collection process.

According to some embodiments of the invention, the PBAs of the storage media are represented by respective logical block addresses (LBAs) in a logical address space, wherein the LBAs are organized in write units (WUs) and wherein each WU may include one or more LBAs.

According to some embodiments of the invention, limiting storage of data objects on the at least one NVM storage device may include:
calculating a portion of WUs of the logical address space that should be reserved, according to the obtained optimal OP;
marking one or more WUs as reserved, according to the calculation; and
disallowing write access to PBAs of the NVM media, that are represented by one or more LBAs comprised in the marked one or more WUs.

The GC process may include one or more of:
setting a GC pointer to point to a first WU of the logical address space;
setting a write pointer to point to a second WU of the logical address space;
reading content of valid data from one or more PBAs that are represented by respective one or more LBAs of the first WU;
writing the read content to one or more PBAs represented by respective one or more LBAs of the second WU; and
calculating the run-time WA ratio based on a distance between the WU pointed by the GC pointer and the WU pointed by the write pointer.

Calculating the run-time WA ratio may be based on the number of one or more WUs marked as reserved, as explained herein.

Embodiments of the invention may further include:
updating at least one pointer value of the GC pointer value and the write pointer value, so as to point to a subsequent WU in the logical address space, in a sequential, cyclical order; and
repeating the GC process with the updated at least one pointer value.

Embodiments of the invention may further include a system for managing OP on NVM computer storage media may include at least one NVM storage device. Embodiments of the system may include a non-transitory memory device, wherein modules of instruction code are stored, and a processor associated with the memory device, and configured to execute the modules of instruction code. Upon execution of the modules of instruction code, the processor may be further configured to perform at least one of:
receive a value of one or more run-time performance parameters pertaining to data access requests to one or more PBAs of the storage media;
receive at least one of a target performance parameter value and a system-inherent parameter value;
analyze the received at least one run-time performance parameter value, to determine an optimal OP ratio of at least one NVM storage device in view of the received at least of a target performance parameter value and system-inherent parameter value; and
limit storage of data objects on the at least one NVM storage device according to the determined OP ratio.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
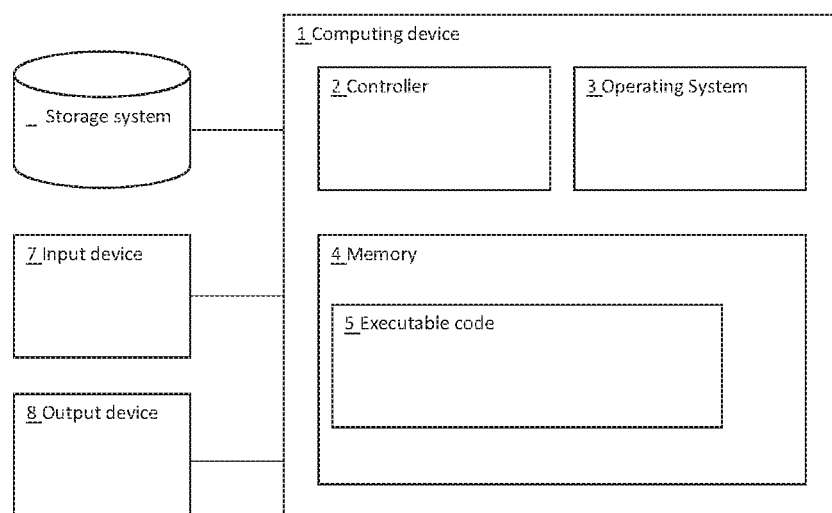
FIG. 1 is a block diagram depicting a computing device, which may be included within a system for managing data storage on non-volatile memory devices, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for providing a single point of control to NVM storage media that may include one or more NVM storage devices. Embodiments may be configured to optimize the write amplification (WA) metric and enhance the NVM storage devices' life-expectancy by cancelling non-cooperative address translations and garbage collection (GC) processes, that may be performed concurrently by applications running on host computers, and by at least one controller of the at least one NVM storage device.

An embodiment may be configured to write data objects onto the NVM media into complete data blocks, and in a sequential, cyclic pattern. When the same data objects are later re-written to the NVM media, complete data blocks become invalid, page after page, in that same order.

From the NVM controller's point-of view, this write pattern may ensure that there would never be valid data objects that are "scattered" in the NVM's physical address space, and need to be copied elsewhere, nor would there be data blocks that need to be aggregated from a plurality of pages of other blocks within the NVM storage media's physical address space. This condition may effectively cancel the operation of the internal NVM controller's GC process, reducing it to merely erasing completely-invalidated blocks, to enable future write access thereto.

Reference is now made to FIG. 1, which is a block diagram depicting a computing device, which may be included within an embodiment of a system for managing NVM computer storage, according to some embodiments.

Computing device 1 may include a controller 2 that may be, for example, a central processing unit processor (CPU), a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that enforces security in a vehicle as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. One or more data elements may be stored in storage system 6 and may be loaded from storage system 6 into memory 120 where it may be processed by controller 2.

For example, the one or more data elements may include historic information pertaining to data access operations. The data access operations may include for example data read operations, data write operations and the like. The data access operations may pertain to or originate from, for example, one or more external sources such as software applications and/or processes executed by external computing device(s) and/or from garbage collection (GC) operations, as elaborated herein.

In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The term "NVM device" is used herein to refer to a single device, such as a flash storage device and a solid-state storage device (SSD) or the like, that may, or may not be managed by an NVM controller. The term "NVM media" 30 is used herein to refer to one or more NVM devices, that may be managed by a single NVM controller 310 or not managed by an NVM controller 310 or managed by a plurality of NVM controllers 310.

Figure 2:
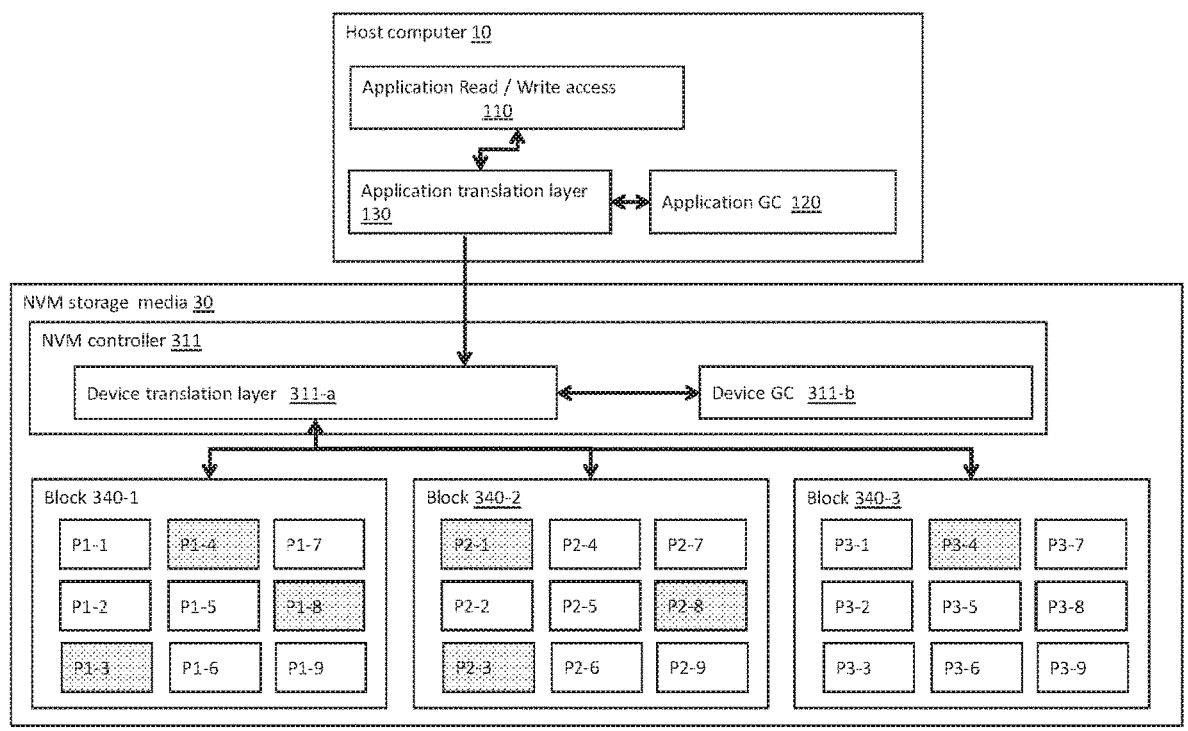
FIG. 2 is a simplified block diagram, depicting a host computer's write operation, in absence of a system for managing data storage on non-volatile memory devices.

Reference is now made to FIG. 2, which depicts a simplified block diagram, depicting a host computer's write operation, in the absence of the system for managing data storage on non-volatile memory devices.

According to some embodiments, host computer 10 may be implemented as a computational device (e.g. element 1 of FIG. 1) and may be running or executing an application 110 that may require storing a data object on NVM storage media 30. Application 110 may be required to work in a virtual application address space, including a plurality of fixed-sized user data blocks.

If the data object is not aligned to the size of the user data blocks, an application translation layer 130 will be required to translate the data object's address to a specific user block address (UBA), and an application-level GC mechanism 120 will be required to retrieve invalid user blocks.

The UBA address may be propagated to NVM storage media 30, to a controller 310, where it may be translated again in an inherent device translation layer 311-*a*, to obtain an addressable, physical location on the NVM media (e.g. page 1-4 on data block 340-1).

NVM controller also employs its own, inherent GC module 311-*b*, which may be oblivious to application GC 120, hence causing duplication of GC write operations on an NVM storage device of NVM storage media 30.

Figure 3A:
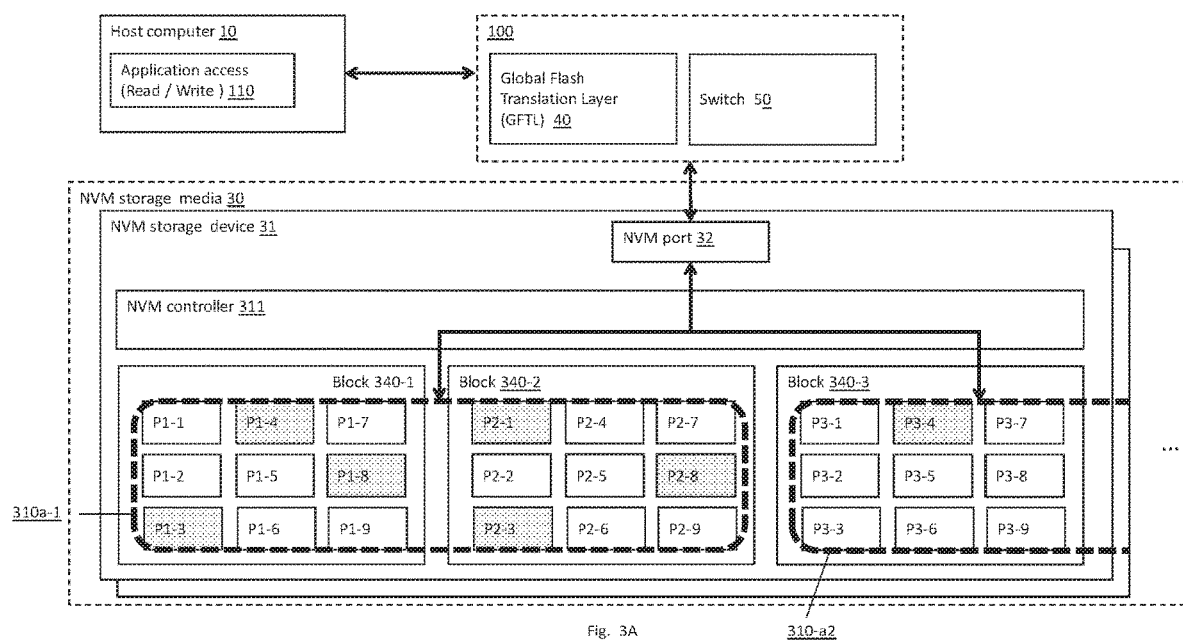
FIG. 3A is a block diagram depicting a system for managing data storage on non-volatile memory devices, according to some embodiments.
Figure 3B:
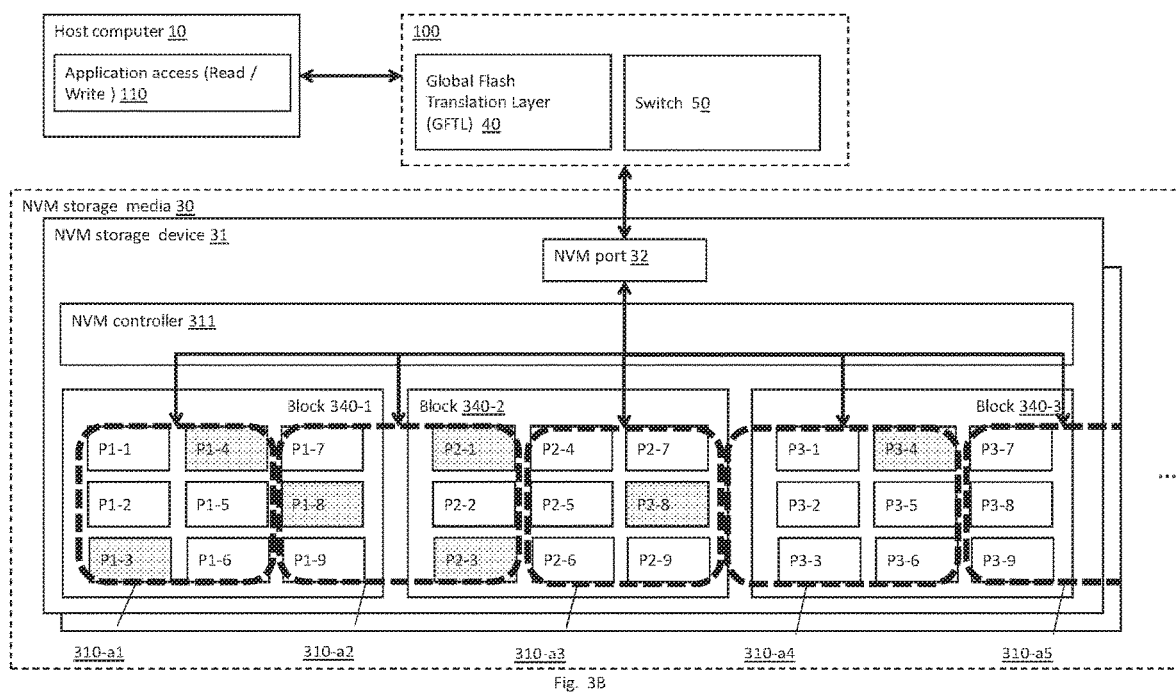
FIG. 3B is a block diagram depicting a system for managing data storage on non-volatile memory devices, according to some embodiments.

Reference is now made to FIG. 3A and FIG. 3B, which are block diagrams depicting examples of embodiments of a system 100 for managing data storage on non-volatile memory devices and/or optimizing WA on one or more NVM storage media 30, according to some embodiments.

Embodiments may manage data storage on NVM media 30 including one or more NVM devices 31 by (a) controlling a mapping of data objects having virtual UBA addresses from an application address space to logical LBA addresses on a logical address space, and (b) sending the data objects referred by the LBA addresses to the one or more NVM storage device for storage, as explained herein.

Embodiments may include a global flash translation layer (GFTL) 40, which may be implemented as a computational device, such as element 1 of FIG. 1. GFTL 40 may be communicatively connected to host computer 10 and associated with at least one NVM storage device 31. For example, GFTL 40 may be connected to host computer 10 via a computer network (e.g. Internet) and attached to NVM 30 through a Peripheral Component Interconnect Express (PCIE) bus.

In another example, NVM media 30 may include one or more NVM devices 31 (e.g., one or more SSD devices) and GFTL 40 may be connected to the one or more (e.g., a plurality) of NVM devices through a port switch 50. Port switch 50 may be configured to route data between an embodiment of system 100 and at least one port 32 of at least one NVM device 31 of the plurality of NVM devices.

Figure 4:
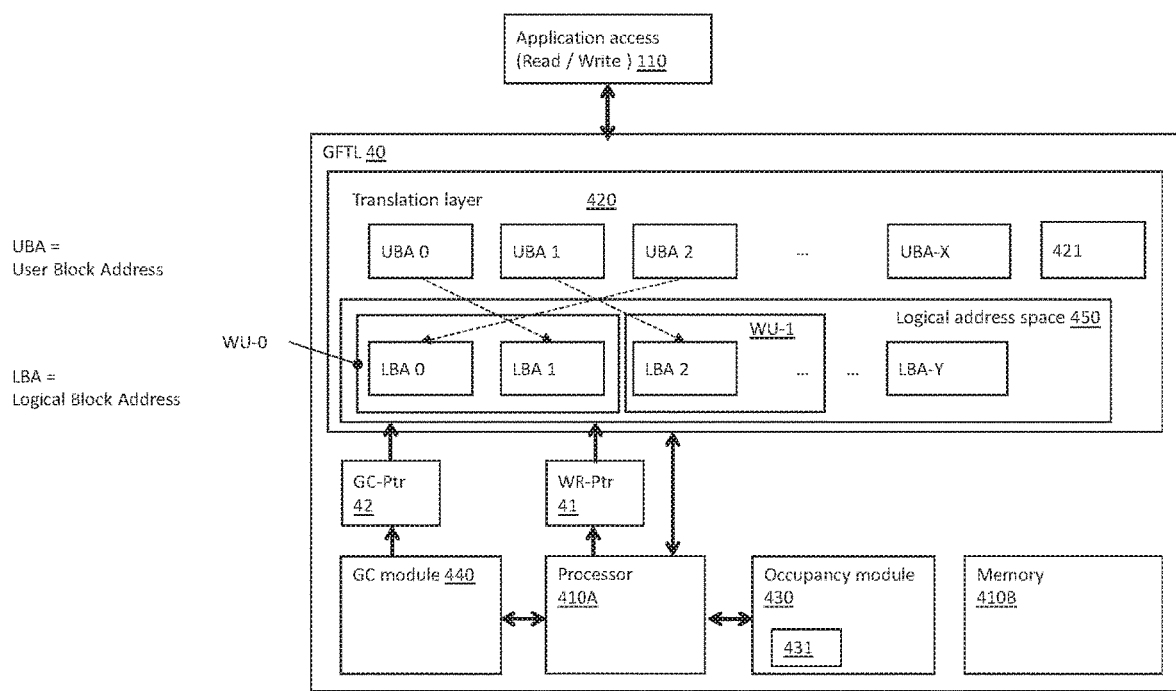
FIG. 4 is a block diagram depicting the content of a Global Flash Translation Layer (GFTL), which may be part of a system for managing data storage on non-volatile memory devices, according to some embodiments.

GFTL 40 may include a logical address space, including a plurality of logical blocks, which may refer to physical data blocks of the NVM storage media (e.g. 340-1, 340-2, 340-3), as explained in relation to FIG. 4, herein.

The logical address space may be divided into a plurality of write units (WUs), as explained further below. Each WU may represent a fixed-sized portion of contiguous pages of the NVM storage media (e.g.: 310-a1, 310-a2).

In some embodiments, at least one WU may represent a portion of the NVM media (e.g.: 310-a1) that may span across one or more NVM devices 31.

GFTL 40 may be configured to provide a single point of control for managing the address translation and GC processes between application 110, running on host computer 10, and the NVM storage media 30, as explained further below.

GFTL 40 may cause a first pointer to reference a WU, having a logical address space. GFTL may then receive a data object having a UBA and map the UBA to an LBA within the WU referenced by the pointer. This operation of receiving data objects and mapping of the UBA address to an LBA address may be repeated until the address space of the WU is filled, e.g. until there is no more space in the WU for an additional received data object.

GFTL 40 may save the data content of the filled WU in at least one PBA of the NVM media, and may continue the operation of receiving data objects, mapping them and storing them as long as at least one application 110 on host computer 10 requires access to NVM storage media 30.

As shown in FIG. 3A, each WU may represent a plurality of physical data blocks of NVM media 30, that may span over one or more NVM devices 31. For example, data blocks 340-1 and 340-2 may reside on the same NVM storage device 31 and a first WU may represent a combined address space 310a-1 of physical data blocks 340-1 and 340-2.

According to some embodiments, NVM storage media 30 may include a plurality of NVM storage devices 31 (e.g., multiple flash devices), and at least one WU may be configured to represent an address space that spans over one or more NVM storage devices 31. For example, data blocks 340-1 and 340-2 may reside on separate NVM storage devices 31 and the first WU may represent a combined address space 310a-1 of physical data blocks 340-1 and 340-2 of the separate NVM devices 31.

Alternately, as shown in FIG. 3B, each WU may represent a contiguous address space, including a plurality of data pages from one or more physical data blocks 340. For example, a second WU may represent the combined address space of pages P1-7, P1-8 and P1-9 of physical data block 340-1 and pages P2-1, P2-2 and P2-3 of physical data block 340-2.

In some embodiments, all WUs of the logical address space may be allocated the same size. This size may be determined according to a variety of parameters, including for example: data storage rate, size of data objects, frequency of data access, the number of NVM devices 31 included in NVM media 30, required WA, etc. The parameters may be stored on a memory device (e.g. element 4 of FIG. 1, element 411 of FIG. 4) or on a header of NVM media 30.

Reference is now made to FIG. 4 is, which is a block diagram depicting the example content of the Global Flash Translation Layer 40 (GFTL), which may be part of the system for managing data storage on non-volatile memory devices, according to some embodiments. GFTL 40 may include a non-transitory computer memory device 410B in which modules of computer instruction code may be stored, and a processor 410A associated with the non-transitory computer memory device 410B and configured to execute the modules of computer instruction code, to implement embodiments of the present invention.

Processor 410A may be configured to allocate a logical address space 450, comprising a plurality of logical blocks (LBA0 thru LBA-Y), wherein each logical block refers to a physical data block of the NVM storage media, as explained below in relation to FIG. 5A and FIG. 5B. The term 'allocation' is used herein to refer to a process by which memory space (e.g. of element 4 of FIG. 1) is dedicated or reserved, e.g. by processor 410A, to the purpose of mapping at least one data object referred by a UBA to an LBA.

Processor 410A may divide the allocated logical address space into a plurality of WUs (e.g. WU-0), wherein each WU has a fixed-sized portion of the allocated logical address space, as explained below in reference to FIG. 5A and FIG. 5B. Each WU of the plurality of W Us may represent a fixed-sized portion of a plurality of data-pages on the NVM storage media, as also explained below in reference to FIG. 5A and FIG. 5B.

Additionally, or alternately, GFTL 40 may be configured to manage storage of data on non-volatile storage media 30 that may be or may include a plurality, or a pool of non-volatile memory devices (e.g., elements 31 of FIG. 3B). In such embodiments, one or more WUs may represent a physical storage space that may be contiguous or non-contiguous and may even span over more than one physical, NVM storage device 31.

For example, each WU (e.g., WU-0, WU-1) may include a plurality of logic blocks, having respective logic block addresses (LBAs, e.g., LBA0, LBA1, etc.) and representing a contiguous portion of logical address space 450. Each LBA may represent a respective physical storage block (e.g., on an NVM storage device 31). The ordering of LBAs may or may not correspond to the ordering of their respective physical block addresses, such that a content of a portion of a WU (e.g., data stored at LBAs included therein) may or may not be stored sequentially on one or more memory devices 340 included in NVM storage media 30.

Processor 410A may be configured to define a cyclic write pointer 41 and set it to point or refer to a WU of the logical address space. Processor 410A may be further configured to define a cyclic GC pointer 42 and set it to point or refer to another WU of the logical address space, different from the WU pointed by write pointer 41.

Write pointer 41 and GC pointer 42 may be cyclic, in the sense that processor 410A may be configured to increment the value of these pointers in a sequential, cyclic pattern, from the first WU of the allocated logical address space 450 to the last WU of the allocated logical address space 450 and, after the last WU, on incrementing, wrap around back to the first W U of the logic address space (e.g., repeat the values of the WU address space).

Processor 410A may locate the GC pointer ahead of the write pointer, to perform garbage collection on the WU pointed by the GC pointer, and thus prepare WUs for write pointer 41, as explained herein. The term 'ahead' in this context relates to the GC pointer referring to a WU that has an address value that is higher than the address value of the write pointer, or a WU that precedes the WU in the order of pointer incrementation, as elaborated below in relation to FIG. 6A, FIG. 6B and FIG. 6C.

For example, write pointer 41 may point to a first address (e.g. 0x10) in logical address space 450, and GC pointer 42 may point to a second address (e.g. 0x20) in logical address space 450. The pointers may be incremented (e.g. 0x11 and 0x21 respectively), keeping GC pointer 42 ahead of write pointer 41 in the direction of pointer incrementation. When the pointers reach the end of the logical address space 450 (e.g. 0xFF), they may be incremented cyclically, back to the beginning of logical address space 450 (e.g. 0x00), keeping GC pointer 42 ahead of write pointer 41 in the direction of pointer incrementation.

According to some embodiments, GFTL 40 may include a translation layer 420, for mapping (e.g., translating) user block addresses (UBAs) to logic block addresses (LBAs) within the logical address space 450. For example, translation layer 420 may take as input a UBA (e.g. an address of a data object received from application 110) and produce as output an LBA. Embodiments of translation layer 420 may be implemented as a translation table 421, associating UBAs with respective LBAs, as shown in the example of FIG. 4 by dashed arrows.

Processor 410A may receive at least one data object having a UBA in the virtual, application address space, to be stored on the NVM storage media. Processor 410A may map or translate the UBA of the data object to an LBA of a logical block within the WU pointed by the cyclic write pointer. For example, as shown in FIG. 4 data stored on UBA 0 may be mapped to LBA 1. Processor 410A may be configured to continuously or repeatedly update the mapping or correspondence between the virtual address of received data objects (e.g. UBA-0, UBA-1, etc.) in the application address space, and their respective addresses in the logical address space (e.g. LBA-0, LBA-1, etc.) in translation layer 420.

According to some embodiments, GFTL 40 may continue to map or translate at least one UBA of a data object to an LBA of a logical block, as long as data objects are received from host 10, or at least as long as data objects need to be garbage-collected. This may be seen as analogous to a perpetual operation of an operating system, that is executed as long as the computing device it resides on is active.

For example, GFTL 40 may receive a UBA address which includes a combination of a namespace address (e.g. an address of a virtual hard drive) and an offset from the namespace address, as known to persons skilled in the art. GFTL 40 may map the UBA address to an LBA address that includes the address of the WU pointed by the write pointer and an offset to a logical data block within that WU. GFTL 40 may pass or send the data object mapped to the LBA address to an NVM storage media (e.g. element 30 of FIG. 2) for storage.

Following the mapping or translation of received data blocks to LBAs, NVM storage media 30 may store the received data objects into physical data blocks of the NVM storage media, having physical block addresses (PBAs). In some embodiments, storage of the data block on NVM storage media may be managed by an NVM media controller (e.g. element 310 of FIG. 2), as known to persons skilled in the art of computer storage.

It is important to note that although GFTL 40 may not directly control the location (e.g. the PBA) of stored data objects on NVM media 30 (that may be controlled by an inherent NVM media controller 310), the order at which data objects are mapped to LBAs of the logical address space may directly affect linearity of data storage on NVM media 30, and the consequent write amplification (WA) of NVM media 30 during its operation, as explained herein.

Data objects may continuously be received (e.g. from application 110 of FIG. 3A) by processor 410A. The data objects may be mapped to LBAs and appended or added to the WU pointed by the write pointer, until the address space of the WU pointed by the cyclic write pointer is full.

For example, each WU may include a continuous range of LBAs, e.g.: WU 0 may include LBA 0 to LBA 7, WU 1 may include LBA 8 to LBA 15, etc. A first UBA (e.g. UBA 'X') may be mapped into a first LBA (e.g. LBA 'Y') within a first WU (e.g. WU 'Z'). This mapping may include writing the content of the first UBA into the address space of the first LBA, and updating translation table 421 of translation layer 420, to translate between the address of the first UBA (e.g. UBA 'X') and the address of the first LBA (e.g. LBA 'Y'). The mapping of UBAs to LBAs in the first WU (e.g. WU 'Z') may continue until the first WU is full, e.g. when there is no room in the WU to include an additional data object by mapping an additional UBA to an LBA therein.

Processor 410A may write the content of the first WU (e.g. WU 7') to an address space of physical data blocks (e.g. element 310-a1 of FIG. 3A) represented by the first WU, that may include one or more physical address blocks, as explained above in relation to FIGS. 3A and 3B.

Processor 410A may update write pointer 41, to point to a next WU (e.g. WU 'Z+1') of the logical address space 450, e.g. the immediately subsequent WU within the logical address space 450, and repeat the process of receiving data objects, mapping them to LBAs and storing them on NVM 30 with the next WU.

For example, processor 410A may increment the value of the write pointer in a sequential, cyclic order, to refer to an adjacent WU of the logical address space 450.

According to some embodiments, GFTL 40 may include a GC module 440, associated with processor 410A, and implemented as a hardware module, a software module or any combination thereof. For example, GC module 440 may be implemented as a software process and may be executed by processor 410A. In another example, GC module 440 may be implemented as a computational device (e.g. element 1 of FIG. 1) and may be communicatively connected to processor 410A.

GC module 440 may be configured to receive GC commands from processor 410A. GC module may perform garbage collection on a WU pointed by the GC pointer 42 and may modify the value of the GC pointer to point to a specific WU of the logic address space 450 according to the received commands.

For example, processor 410A may command GC module to: set the GC pointer 42 value to point to a WU of the allocated logical address space that is ahead of the WU pointed by the write pointer; perform GC on the WU pointed by the GC pointer; and update the GC pointer value to point to a next or immediately subsequent WU (e.g. in a sequential, cyclic order, as explained above).

According to some embodiments, GFTL 40 may include an occupancy module 430, associated with processor 410A, and implemented as a hardware module, a software module or any combination thereof. For example, occupancy module 430 may be implemented as a software process and may be executed by processor 410A. In another example, occupancy module 430 may be implemented as a computational device (e.g. element 1 of FIG. 1) and may be communicatively connected to processor 410A.

Occupancy module 430 may be configured to continuously monitor mapping of data objects to LBAs, and garbage collection from LBAs within, and maintain (e.g., on a metadata table such as element 431) at least one of:
an updated status of validity of each data page within each LBA; and
an updated status of occupancy for each WU.

According to some embodiments, occupancy module 430 may be associated with processor 410A and may perform these actions according to commands received from processor 410A.

For example, during a GC process, valid data pages may be moved from a first LBA (e.g. LBA-1), pointed by GC pointer 42 to a second LBA (e.g.: LBA-2), pointed by write pointer 41. Occupancy module 430 may consequently: (a) mark or label read pages within LBA-1 as invalid (e.g., in table 431); (b) mark written pages within LBA-2 as valid (e.g., in table 431); (c) calculate the occupancy of the WUs pointed by write pointer 41 and GC pointer 42 as the percentage of valid pages from the total number of addressable pages within the respective WUs; and (d) maintain an updated level of occupancy per each WU in metadata table 431.

According to some embodiments, metadata table 431 may be implemented in the same table as translation table 421. In alternate embodiments, metadata table 431 and translation table 421 may be implemented as separate instances.

Processor 410A may be configured to perform garbage collection on the WU pointed to by the cyclic GC pointer, to "clear the way" and prepare WUs for the write pointer and increment the cyclic GC pointer according to the value of the cyclic write pointer.

According to some embodiments, the process of GC performed by GC module 440 may include at least one of: (a) reading content of at least one valid data page in the WU pointed by the GC pointer; (b) marking the at least one page in the WU pointed by the GC pointer as invalid; (c) writing the content into at least one page in the WU pointed by the write pointer; and (d) marking the at least one page in the WU pointed by the write pointer as valid.

The GC process described may prevent the NVM storage media controller 311 from performing GC on physical data blocks that are associated with the WU pointed by the cyclic GC pointer, because it may retrieve all valid data pages from the WU pointed by the GC and aggregate them in the WU pointed by the cyclic write pointer, and therefore may render an inherent GC of the NVM controller 311 redundant.

Figure 5A:
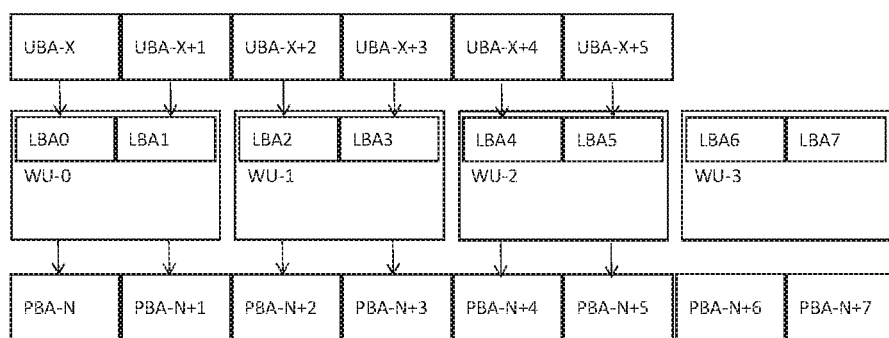
FIGS. 5A and 5B are schematic diagrams, depicting example of the operation of the GFTL, which may be part of a system for managing data storage on non-volatile memory devices, according to some embodiments.
Figure 5B:
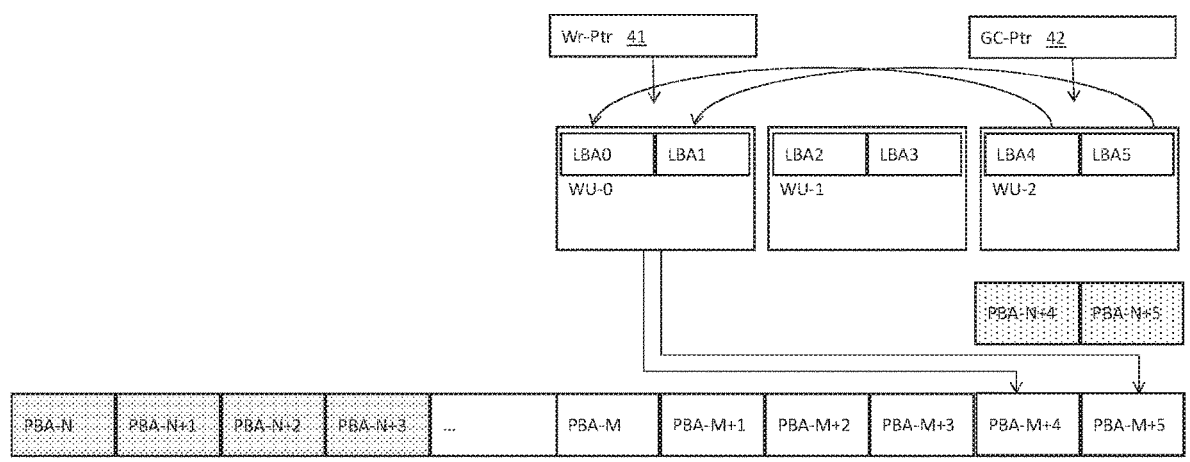

Reference is now made to FIGS. 5A and 5B, which are schematic diagrams, depicting an example of the operation of GFTL 40 and GC module 440, which may be part of a system for managing data storage on non-volatile memory devices, according to some embodiments.

FIG. 5A shows an exemplary condition of an embodiment, prior to applying GC by GC-module 400. A processor (e.g. element 410A of FIG. 4) may have received a plurality of data objects, pertaining to UBA X thru UBA X+5, and may have mapped them sequentially to LBA 0 thru LBA 5, that are included within WUs WU-0 thru WU-2 respectively. WU-0 thru WU-2 may have been filled to a point that additional data objects may not have been mapped thereto and may consequently be referred to as 'full' WUs.

It is important to note that as the mapping of data objects to LBAs may have been done sequentially, according to the location of the cyclic write pointer (e.g. element 41 of FIG. 4) as explained above, NVM controller (e.g. element 311 of FIG. 2) may have consequently stored the received data objects sequentially, to physical data blocks PBA-N thru PBA N+5.

FIG. 5B shows an exemplary condition of an embodiment during application of GC by GC module 440. As shown in FIG. 5B, GC pointer 42 may have gone through WU-0 and WU-1 and may now be pointing to WU-2. Write pointer 41 may have gone through previous WUs (not shown) and may now be pointing to WU-0. According to some embodiments, GC pointer may always point to a WU that is advanced in relation to the write pointer, in the direction of the WU's direction of incrementation, to prepare WUs to be written by the write pointer.

As shown in FIG. 5B, data objects that may have previously been mapped to full WU-0 and WU-1 may have been mapped elsewhere (not shown), and respective data objects that have resided in physical data blocks PBA-N thru PBA N+3 may have already been collected therefrom and written sequentially to PBA-M thru PBA M+3. During this process, NVM controller may only have needed to write the content of full WUs WU-0 and WU-1 to physical data blocks PBA-M thru PBA M+3 and may not have needed to check the validity of data pages PBA-N thru PBA N+3 or perform GC thereupon, thus rendering an inherent GC process as redundant. NVM controller 311 may now only erase PBA-N thru PBA N+3, and thus prepare them for writing.

According to some embodiments, the sequential order of written data objects on physical data blocks (e.g.: movement from sequential locations PBA-N thru PBA N+3 to PBA-M thru PBA M+3) may be maintained by the NVM controller, because physical data blocks are invalidated and erased by GC module 440 in the same sequential order in which they have been written by GI-IL 40. As a result, the linearity of stored sequential data that may have been received from a host computer (e.g. element 10 of FIG. 2) by processor 410A may be maintained throughout data deletion and modification and may not be corrupted by an inherent GC process.

As further shown in FIG. 5B, data objects that may have been mapped to LBA4 and LBA5, within WU-2, which may be pointed by GC pointer 42, may be remapped to freed WU-0, which may be pointed by write pointer 41. Physical data blocks PBA N+4 and PBA N+5 may be about to be invalidated, and NVM controller 311 may be about to write the new content of now re-filled WU-0 in sequential order to physical data blocks PBA M+4 and PBA M+5.

As discussed above, in relation to FIG. 4, processor 410A may be configured to control occupancy module 430, to analyze data relating to the validity of pages, as stored in metadata table 431, and obtain a parameter of occupancy for each WU.

Processor 410A may receive (e.g. via a user interface, from the non-transitory memory device and the like) at least one parameter and may increment the cyclic GC pointer according to at least one of: the value of the cyclic write pointer, the at least one parameter and the occupancy of at least one WU.

For example: processor 410A may receive an occupancy threshold parameter (e.g. 90%) and determine whether at least one WU is occupied beyond the occupancy threshold parameter (e.g. the number of valid pages within the WU exceeds 90% of the total number of pages in that WU). Processor 410A may consequently mark or label the at least one WU in which the occupancy is above a predefined occupancy threshold as 'occupied' in metadata table 431.

Processor 410A may control the GC pointer (e.g. element 42 of FIG. 4), write pointer (e.g. element 41 of FIG. 4) and GC module 440 according to the marked occupancy so:

if GC pointer 42 points to a non-occupied WU, then command GC module 440 to perform GC and increment GC pointer 42 to the next WU (e.g. the immediately subsequent WU within the logical address space 450);

if GC pointer 42 points to an occupied. WU, then command GC module 440 to increment GC pointer 42 without performing GC on the occupied WU;

if write pointer 41 points to a non-occupied WU, then map UBA of received data objects to at least one LBA within the WU until the WU is full, and then increment the write pointer to the next WU; and if the write pointer 41 points to an occupied WU, then increment write pointer 41 to the next WU, without mapping UBA of received data objects to the occupied WU.

Experimental results show that skipping occupied WUs may enable GFTL 40 to improve the WA in the presence of 'cold' valid data (e.g. data that remains valid from one write cycle to another in the same physical location and is not copied to another physical location). However, skipping occupied WUs by GFTL 40 may cause some inherent GC activity within the NVM controller (e.g. element 311 of FIG. 2), because it breaks the sequential, cyclic write order. Experiments show that a 'global' write amplification metric may be regarded as a product of WA caused by GFTL 40 and inherent WA, caused by NVM controller 311, as shown in the following equation Eq. 2:

$$\text{Global-}WA = WA\text{-GFTL} \times WA\text{-NVM} \qquad \text{Eq. 2}$$

From GFTL's 40 perspective, WUs that have been skipped may not require GFTL, GC read and write operations. This means that some of the write amplification (WA) has been moved from GFTL 40 to NVM controller 311. Even though the entity performing GC read and write operations has changed due to the sequential write order, GC read and write operations have not been duplicated, and hence the global WA has not increased due to skipping occupied WUs. Moreover, according to some embodiments, if the same WUs are skipped from one write-cycle to another, NVM controller 311 may be configured to identify the data as 'cold' and avoid performing GC operations on the respective physical data blocks altogether, thus decreasing the global WA despite skipping occupied WUs.

Figure 6A:
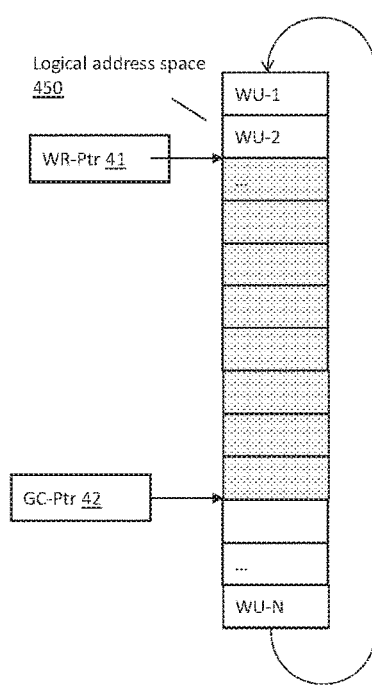
FIG. 6A, 6B, 6C are block diagrams depicting WUs that may be included in the logical address space, and different locations of the write pointer and garbage-collection (GC) pointer, which may be part of a system for managing data storage on non-volatile memory devices, according to some embodiments.
Figure 6B:
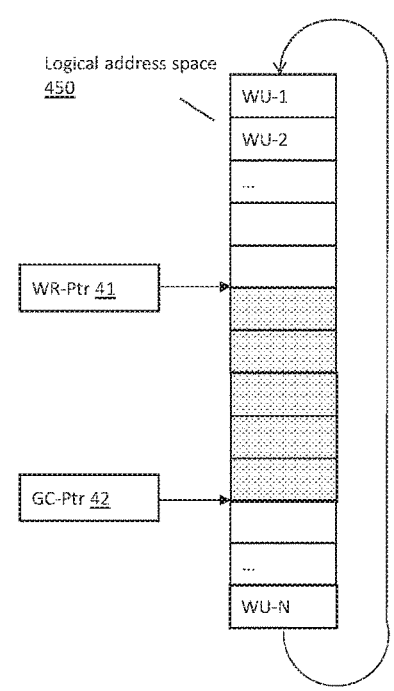
Figure 6C:
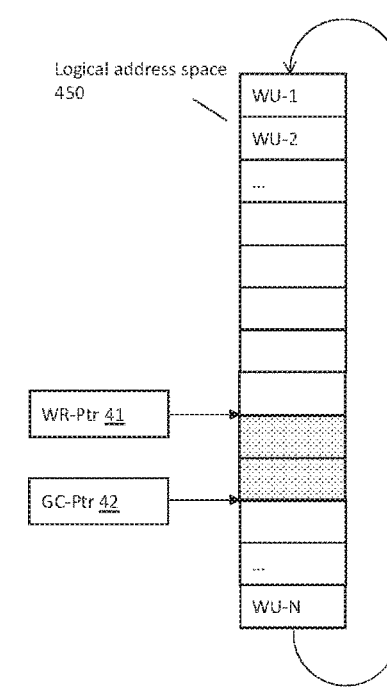

Reference is now made to FIG. 6A, FIG. 6B, and FIG. 6C which are block diagrams depicting the WUs included in logical address space 450 that may be included in a system for managing data storage on non-volatile memory devices, according to some embodiments. FIG. 6A, FIG. 6B and FIG. 6C present different examples of locations of write pointer 41 and GC pointer 42.

GC pointer 42 and write pointer 41 are configured to be incremented sequentially, in a cyclic pattern. Valid data may be copied from a WU pointed by GC pointer 42, to a WU pointed by write pointer 41. The only difference between FIG. 6A, FIG. 6B and FIG. 6C is in the distance between GC pointer 42 and write pointer 41. The term 'distance' as used herein may mean the number of WUs in the gap between GC pointer 42 and write pointer 41.

FIG. 6A depicts a large distance between GC pointer 42 and write pointer 41. This distance may enable a host computer (e.g. element 10 of FIG. 2) to perform multiple write operations to the NVM storage media (e.g.: element 30 of FIG. 2), without need to perform garbage collection.

FIG. 6C depicts a small distance between GC pointer 42 and write pointer 41. This distance may not enable host computer 10 to perform a large number of write operations to NVM storage media 30 without first performing garbage collection on physical data blocks.

FIG. 6B depicts an intermediate distance between GC pointer 42 and write pointer 41. This distance may enable host computer 10 to perform an intermediate number of write operations to the NVM storage media 30, without a need to perform garbage collection.

According to some embodiments, a processor (e.g. element 410A of FIG. 4) may be configured to receive at least one parameter (e.g. from a user interface, from the non-transitory memory device and the like) and increment the cyclic GC pointer according to at least one of: the value of the cyclic write pointer and the at least one parameter. According to some embodiments, the at least one parameter may be for example: the size of data objects, frequency of data write requests (e.g. by host computer 10), the size of WUs, and a required write amplification (WA) value.

For example, processor 410A may choose to increase a frequency of GC (and consequent incrementation of the value of GC pointer 42) when: (a) the size of data objects is large; (b) the frequency of data write requests is high; (c) the size of WUs is small, and/or (d) the required write amplification is high (e.g. above a predefined threshold). In a complementary manner, processor 410A may choose to decrease the frequency of GC (and consequent incrementation of the value of GC pointer 42) when: (a) the size of data objects is small; (b) the frequency of data write requests is low; (c) the size of WUs is large; and/or (d) the required write amplification is low (e.g. above a predefined threshold).

According to experimental results, the distance between the cyclic GC pointer and the cyclic write pointer affects the ratio between user write operations and GC write operations. A small distance tends to increase the portion of GC write operations from the total number NVM write operations and increase the write amplification (WA). In a complementary manner, a large distance tends to decrease the portion of GC write operations from the total number NVM write operations and decrease the WA.

As explained above, each WU (WU) may represent a contiguous address space, including a plurality of data pages from one or more physical data blocks. According to experimental results, performing a GC operation using large WUs (e.g. WUs that include a large number of data pages) may require less GC write operations, in relation to GC operations using small WUs. As a result, when small WUs are used (e.g. to reduce the interference of write operations on user read operations), a large distance between the cyclic GC pointer and the cyclic write pointer may be preferable. In a complementary manner, when large WUs are used, the GC process may require a small number of write operations, and a small distance between the cyclic GC pointer and the cyclic write pointer may be defined.

As known to persons skilled in the art of computer storage, NVM devices 31 require auxiliary physical storage space, commonly referred to as "over-provisioning" to function properly. The additional over-provisioning storage space may directly affect one or more performance parameters of storage system 100, including for example the WA. As an approximation, WA may be assessed according to the following equation Eq. 3:

$$WA = [(1/\text{RESERVE\_SPACE\_RATIO}) + \text{RE-SERVE\_SPACE\_RATIO}]/2 \qquad \text{Eq. 3}$$

where RESERVE_SPACE_RATIO is the percentage of the total storage media reserved for GC.

For example: if NVM controller 311 exposes 70% of the media and keeps 30% for GC, the WA may be approximated as $[(1/0.3)+0.3]/2 \sim 1.812$. If NVM controller 311 exposes 80% of the media, WA may be assessed as 2.6.

As known to persons skilled in the art of computer storage, the reserved storage space may not be decreased by software, as it is used internally by the NVM device 31. However, embodiments may effectively increase the reserved storage space by software if the software limits itself to writes only to a portion of the storage exposed by NVM controller 311. For example, embodiments of GFTL 40 may only enable mapping UBAs to LBA-0 thru LBA-80, when NVM media 30 is configured to receive LBA addresses LBA-0 thru LBA-100.

Figure 7:
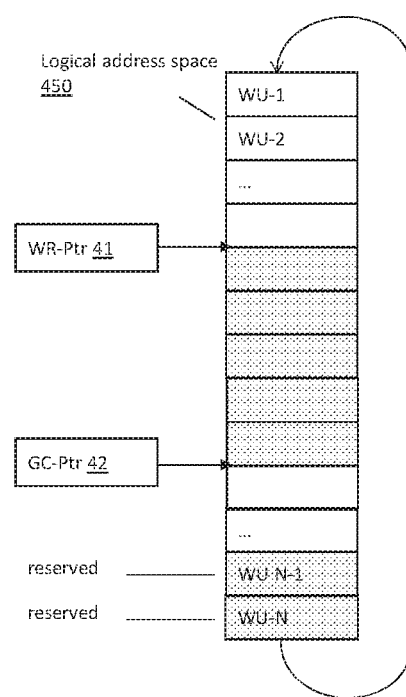
FIG. 7 is a block diagram depicting WUs that may be included in a logical address space, and WUs that are declared as reserved, which may be part of a system for managing data storage on non-volatile memory devices, according to some embodiments.

Reference is now made to FIG. 7, which is a block diagram depicting an example of the WUs that are included within the logical address space 450. This includes WUs that are declared as reserved (e.g. WU N-1 and WU N), according to some embodiments.

A processor (e.g. element 410A of FIG. 4) may be configured to receive (e.g. via a user interface, from the non-transitory memory device and the like) a predefined percentage of WUs, that are to be kept for over-provisioning. Processor 410A may mark or label at least one WU (e.g. WU N-1 and WU N) as reserved for over-provisioning, according to the predefined percentage. Processor 410A may control the operation of IL 40 according to the marking of WUs so:

if the GC pointer points to a non-reserved WU, then perform GC and incrementing the GC pointer to the next WU;

if the GC pointer points to a reserved WU, then incrementing the GC pointer, to point to the next WU, without performing GC on the reserved WU;

if the write pointer points to a non-reserved WU, then mapping UBA of received data objects to at least one LBA within the WU until the WU is full, and then incrementing the write pointer to the next. WU; and if the write pointer points to a reserved WU, then incrementing the write pointer to point to the next WU without mapping UBA of received data objects to the occupied WU, to effectively increase the over-provisioning of the NVM media.

As discussed above, when GFTL skips occupied WUs, NVM controller 311 may execute internal GC processes on NVM storage data blocks referred to by the skipped WUs.

According to some embodiments, the mechanism described above for effectively increasing NVM storage media 30 over-provisioning may be further applied to compensate for such internal GC processes, and decrease the WA: as more WUs may be marked as reserved by processor 410A, the effective over-provisioning may be increased, and the WA caused by internal GC may be decreased.

According to some embodiments, processor 410A may be configured to dynamically adjust the effective over-provisioning, to accommodate a required level of WA.

For example, processor 410A may be configured to: (a) receive a required level of WA; (b) analyze the data in a metadata table (e.g. element 431 of FIG. 4) of the occupancy module (e.g. element 430 of FIG. 4), to obtain a parameter of occupancy for each WU; (c) mark WUs in which the occupancy is above a predefined occupancy threshold as occupied; (d) determine the actual, run-time WA according to at least one of: the number of occupied WUs, the number of reserved WUs, and a distance between the write pointer and the GC pointer; and (e) dynamically adjust the percentage of WUs, that are to be reserved for over-provisioning, so as to effectively adjust NVM media's 30 over-provisioning, and accommodate the required WA, e.g. according to Eq. 3.

Figure 8:
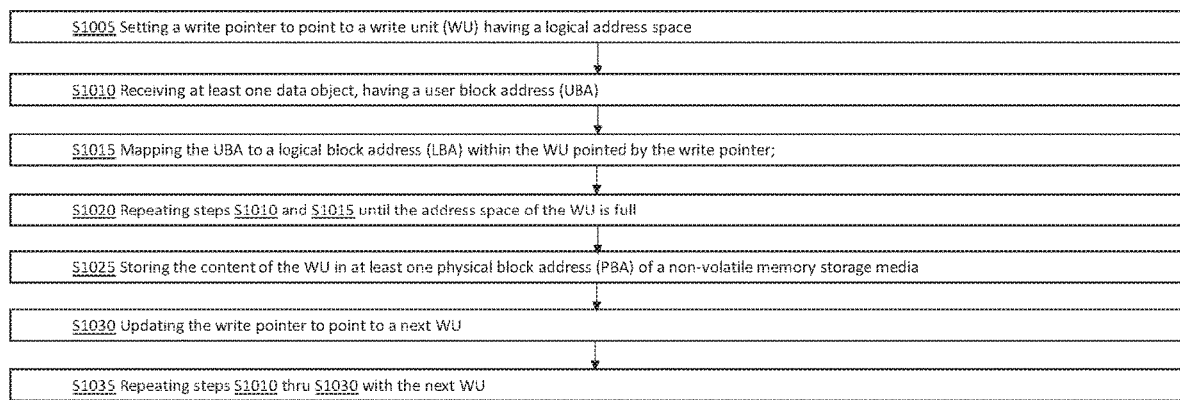
FIG. 8 depicts a flow diagram, elaborating a method of managing data storage on non-volatile memory devices and optimizing WA of the NVM storage devices, according to some embodiments.

Reference is now made to FIG. 8, which depicts a flow diagram, elaborating a method of managing NVM computer storage media and optimizing WA of the NVM storage media, according to some embodiments.

Embodiments of the method may include defining, by a processor (e.g. element 410A of FIG. 4) a logical address space (e.g. element 450 of FIG. 4), including a plurality of logical blocks (e.g. LBA0, LBA1, etc. of FIG. 4). Each logical block may refer to at least one physical data block (e.g. PBA-N, PBA-N+1, etc. of FIG. 5A) of the NVM storage media. The logical address space 450 may be divided into a plurality of WUs (e.g. WH-0, WU-1, etc. of FIG. 4), wherein each WU represents a fixed-sized chunk of contiguous pages of the NVM storage media (e.g. elements 310-a1, 310-a2, etc. of FIGS. 3A and 3B).

In step S1005, embodiments may include setting, by processor 410A, a write pointer (e.g. element 41 of FIG. 4), to point to a WU (e.g. WU-0), having a logical address space (e.g. including LBA 0 and LBA 1).

In step S1010, embodiments may include receiving (e.g. from an application 110 executed on a host computer 10), by processor 410A, at least one data object, having a user block address (e.g. UBA 0).

In step S1015, embodiments may include mapping, by processor 410A, the UBA (e.g. UBA 0) to an LBA (e.g. LBA 0) within the WU (e.g. WU-0) pointed by the write pointer. In some embodiments, mapping of a UBA into an LBA may include writing the content of the UBA into the address space of the LBA and updating a translation table (e.g. element 421 of FIG. 4 in translation layer 420 of FIG. 4), to translate and/or associate the UBA with the LBA.

In step S1020, previous steps S1010 (e.g. receiving data objects) and S1015 (e.g. mapping of UBAs to LBAs) may be repeated until the address space of the WU is full, (e.g. until there is no vacant space in the WU to store an additional data object received from application 110).

In step S1025, embodiments may include storing, by processor 410A, the content of the WU (e.g. the at least one data object stored therein) in at least one PBA. For example, as depicted in FIG. 5A, a plurality of data object having a respective plurality of user-block address (e.g. UBA-X, UBA-X+1) may have been mapped into a plurality of LBAs (e.g. LBA0, LBA1) of a WU (e.g. WU-0). When the WU is full, its content may be stored in at least one physical block address (e.g. PBA-N, PBA-N+1), that is associated with the LBAs (e.g. LBA0, LBA1).

In step S1030, embodiments may include updating, by the processor, the write pointer to point to a next WU (e.g. WU-1 of FIG. 5A). For example, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

In step S1035, embodiments may include repeating steps S1010 thru S1030 with the next WU, e.g. according the incrementation of the WU write pointer.

Figure 9:
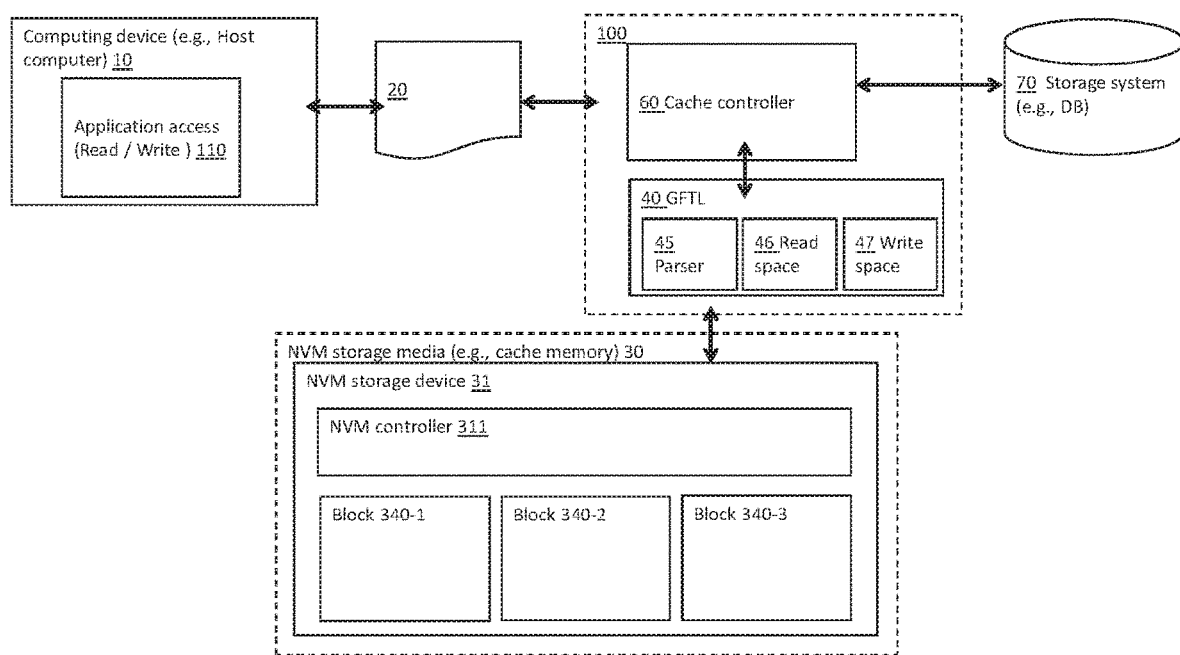
FIG. 9 is a block diagram depicting a system for managing data storage on non-volatile memory devices, according to some embodiments.

Reference is now made to FIG. 9, which is a block diagram depicting a system 100 for managing storage of data objects on NVM computer storage media 30 including one or more NVM storage devices 31, according to some embodiments. Additional elements and/or modules of system 100 as elaborated herein have been omitted from FIG. 9 and will not be repeated here for the purpose of clarity and brevity.

As shown in FIG. 9, at least one computing device (e.g., a host computer) may facilitate or execute at least one software process or application 110 that may require access (e.g., data read access, data write access, etc.) to one or more data elements 20 that may be stored on a data storage system 70 (e.g., a database).

According to some embodiments, the at least one computing device 10 may be communicatively connected to a storage system 70 via system 100. System 100 may be adapted to manage storage of data on at least one NVM storage device 31 of NVM storage media 30, as elaborated herein.

The at least one computing device 10 may be communicatively connected to system 100 via a first, remote connection, such as a remote computer communication network, including for example a wide area network (WAN) a local area network (LAN) and a cellular data network. According to some embodiments, system 100 may serve one or more computing devices 10, and may receive from the one or more computing devices 10 one or more access requests for storage and/or retrieval of one or more data objects 20 via the remote communication network.

System 100 may be connected or attached to at least one NVM device 31 of NVM media 30 through a local connection, including for example a Peripheral Component Interconnect Express (PCIE) bus and/or a PCIE switch (e.g., element 50 of FIGS. 3A and 3B). The connection of system 100 to the at least one NVM device 31 may be regarded as local (e.g., in contrast to a remote connection of system 100 to computing device 10), in a sense that it may not convey disaggregated data according to network limitations and constraints and may not require network-related overhead associated with transfer of data frames and/or packets therein.

As elaborated herein, GFTL 40 may be configured to locally perform (e.g., via a local data and/or address bus such as a PCIE bus connection, rather than over a computer network such as the internet) a combined process of garbage collection and cache management on the at least one NVM storage device 31 of NVM storage media 30. Due to the local connection of GFTL with the NVM media, management of cache data storage on the at least one NVM storage device 31 may not require overhead data traffic remote connection of system 100 (e.g., to a computing device 10 such as a host computer). In some embodiments of the invention, this may provide an improvement over state-of-the-art caching systems, that may handle the staleness or status of expiration of cached data in the application level on a remote computing device (e.g., computing device 10), and may thus require repetitive access over a computer communication network (e.g., an organizational Ethernet network) that may lead to data traffic congestion.

System 100 may further be connected via a third connection to storage system 70 (e.g., a database) and may manage caching of data stored on storage 70, in relation to computing device 10.

In other words, system 100 may store a first copy of at least one data element 20 on database 70, and a second copy of the at least one data element 20 on an NVM-based cache memory device 31. System 100 may be configured to retrieve the value of the at least one data element 20 or a reference (e.g., a pointer) thereto upon request (e.g., a data read request) from computing device 10 (e.g., from application 110 executed therein). As known to persons skilled in the art, system 100 may be adapted to prioritize or prefer retrieval of the stored data element according to the latency of retrieval. For example, system 100 may be configured to primarily retrieve the copy of data object 20 from a local cache (e.g., from NVM device 31), and only retrieve the copy of data object 20 from the database if the copy on the NMV cache 31 is invalid, expired or non-existent, as elaborated herein.

According to some embodiments, system 100 may receive (e.g., from computing device 10) at least one data object 20 for storage on a storage system 70 (e.g., a database).

According to some embodiments, data object 20 may include a content of one or more data elements, such as a value of a variable, a content of a file, a content of a volume and the like to be stored. Additionally, or alternately, data object 20 may include one or more metadata elements pertaining to the one or more metadata elements. For example, storage system 70 may be configured to store one or more data objects 20 according to a key/value storage scheme as known in the art and so data object 20 may include one or more 'key' metadata elements and one or more respective 'value' data elements.

According to some embodiments, the one or more received data objects 20 may include (e.g., as part of the one or more metadata elements) a respective or associated time-to-live (TTL) value or other value, representing an expiration time of the received data element. For example, in a condition where a user or an application may access a storage system to store the data object according to a key/value storage scheme as known in the art, the TTL metadata value may be included within the data object's key metadata.

According to some embodiments, application 110 may be configured to set the TTL value globally, (e.g., as in a UTC time-stamp format), relatively (e.g., in relation to another, predefined point in time) or as a duration (e.g., a duration since the storage of the relevant data object).

Additionally, or alternately, application 110 may be configured to set a TTL based on specific data types (e.g., according to a predefined configuration of the application), thus determining the time of expiration for elements of the respective data types. For example, an application 110 that handles personal contact details in a social network may be configured (e.g., by an administrative user) to set a TTL of contact details of a 'friend' to expire 1 year after the date of storage. In another example, an artificial intelligence (AI) based application 110 that may be adapted to predict a user's taste in clothing may be configured (e.g., via input device 7 of FIG. 1) to set a TTL of data pertaining to previous choices of the user to 1 month after the date of storage, etc.

System 100 may include a cache controller module 60, that may be configured to determine whether to cache (e.g., to store on an NVM-based cache memory device 31) the received data object 20, as known in the art.

Additionally, or alternately, cache controller 60 may be configured to calculate and/or set the TTL time. For example, cache controller 60 may receive the request to store data object 20 and calculate a future expiration time TTL based on the type of data object and the present time. Pertaining to the example of the social network 'friend', cache controller 60 may calculate and/or set the TTL to be one year from the time of receiving data object 20.

In embodiments where data object 20 (e.g., a data structure such as a table) may include a plurality of data elements (e.g., entries or fields in the data structure), cache controller 60 may receive and/or compute one or more respective TTLs (e.g., one TTL per each data element included in data object 20). For example, cache controller 60 may associate a first TTL with a first data element, associate a second TTL with a second data element, etc.

As explained herein, in relation to FIG. 4, data object 20 may have or may be associated with a virtual address in the application's address space. The virtual address may for example, include a namespace (e.g., a virtual drive, as known in the art) and a virtual user block address (UBA), which is an offset from the namespace within the application address space.

As explained herein, in relation to FIG. 4, the PBAs of the storage media may be represented by respective logical block addresses (LBAs) in a logical address space, and the LBAs may be organized in write units (WUs), each comprising one or more LBAs.

GFTL 40 may be configured to map the UBA to an LBA that may be included in a write unit (WU) pointed by write pointer 41. According to some embodiments, mapping the UBA to an LBA may include: (a) writing the content of the LBA (e.g., the content of the received one or more data objects 20) to at least one LBA within the WU pointed by write pointer 41; and (b) updating a translation table (e.g. element 421 of FIG. 4) accordingly, to translate and/or associate the UBA of received data element 20 with the respective LBA, as elaborated in relation to FIG. 4.

As explained herein, in relation to FIG. 4, GFTL 40 may:

continue writing content of UBAs (e.g., data and metadata associated with one or more data objects 20) until the WU pointed by write pointer 41 is full;

store the content of the one or more LBAs (e.g., the one or more data objects) included in the WU pointed by write pointer 41 on respective one or more physical block addresses (PBAs) of the storage media (e.g., PBAs represented by the LBAs in logical address space 450); and increment write pointer 41 to point to the next WU, in a serial, cyclic order.

As explained herein, in relation to FIGS. 4, 5A and 5B, GFTL 40 may perform a garbage collection process on one or more PBAs of the storage media based on the validity of stored data elements. For example:

occupancy module 430 may be configured to continuously monitor mapping of data objects to LBAs, and garbage collection from LBAs within;

occupancy module 430 may maintain at least one of: an updated status of validity of each data page within each LBA and an updated status of occupancy for each WU; and GFTL 40 may perform garbage collection by aggregating valid data pages from a first LBA in a first WU pointed by GC pointer 42 to a second LBA in a second WU pointed by write pointer 41.

The garbage collection process may include (a) setting GC pointer 42 to point to a first WU of the logical address space; (b) reading content of valid, non-expired data from one or more PBAs that are represented by the first WU; (c) writing the read content to one or more PBAs represented by a second WU of the logical address space (e.g., the WU pointed by write pointer 41); and (d) updating the value of GC pointer 42 sequentially to point to a subsequent WU in the logical address space.

As elaborated herein, in relation to FIGS. 6A, 6B, 6C and 7, updating of GC pointer 42 may be performed in a cyclical order, over at least a subset of WUs of the logical address space 450. The term subset is used herein to refer to the entire logical address space 450 or a part of the address space with the exclusion of one or more WUs (e.g., reserved WUs and/or occupied WUs, as explained herein). Updating of GC pointer 42 may be performed in a cyclical order in a sense that it may follow a serial order of WUs from a first WU to a last WU of the subset of WUs of the logical address space 450 and roll back to the first WU.

As elaborated herein, in relation to FIGS. 6A, 6B, 6C and 7, writing the read content may include: (a) setting write pointer 41 to point to a WU of the logical address space; (b) writing the read content to one or more PBAs represented by the second WU; and (c) updating the write pointer in a cyclical order, over the subset of WUs of the logical address space 450, so as to 'follow' the advancement of GC pointer 42.

Additionally, or alternately, GFTL 40 may perform a garbage collection process on one or more PBAs of the storage media based on at least one TTL value stored at a PBA of the storage media (e.g., purge data objects that have expired, as indicated by their respective TTLs), as explained herein.

As shown in FIG. 9, According to some embodiments, GFTL 40 may further include one or more of: (a) a read memory address space 46; (b) a write memory address space 47; and (c) a parser module 45.

GFTL 40 may be configured to read the content of at least one data object 20 stored on one or more first. PBAs of NVM storage device 31 that are represented by respective one or more first LBAs, that are included in a WU pointed by GC pointer 42. According to some embodiments, reading the content of at least one data object may include copying the read data object to read memory address space 46. The read data content may contain data of valid and invalid pages (e.g. new data-objects and overwritten data objects respectively). The read data content may also contain expired and non-expired data elements (e.g., data elements having or associated with a TTL value that represents a real-world time that has already elapsed, or that has not yet elapsed, respectively).

Parsing module 45 may be configured to parse the one or more read data objects to extract one or more TTL value associated with or respective to the one or more read data objects, stored in the one or more first PBAs. According to some embodiments, parsing module 45 may be configured to determine a status of expiration of storage of one or more read data objects, as one of expired and non-expired, based on the respective extracted TTL values. Additionally, or alternatively, parsing module 45 may mark (e.g., by a dedicated, Boolean flag in read address space 46) data objects according to their determined status of expiration. For example, parsing module 45 may determine data objects that are associated with a TTL value that has already elapsed (e.g. by determining the TTL value is earlier and thus in the past when compared to a current actual time) as expired and mark them as such (e.g., by the Boolean flag) and determine data objects that are associated with a TTL value that has not yet elapsed as non-expired and mark them as such (e.g., by the Boolean flag). As elaborated herein, in relation to FIG. 4, GFTL 40 may be configured to monitor mapping of UBAs of data objects onto respective LBAs and maintain a status of validity of each data page within each LBA (e.g., on metadata table 431). In other words, GFTL 40 may monitor write operations of data objects on the NVM storage media 30 and maintain a status of validity of storage of data objects thereat, as one of valid and invalid, based on the monitored write operations.

GFTL 40 may manage the storage of the received one or more data objects on PBAs of the storage media based on at least one of: the status of validity of one or more data objects and/or the TTL or status of expiration of one or more data objects, as elaborated herein.

GFTL 40 may copy valid, non-expired data pages (e.g., data pages that correspond to data objects that are marked as valid in metadata table 431 and marked as non-expired in read address space 46) from read memory address space 46 to write memory address space 47. According to some embodiments, copying of data from read memory address space 46 to write memory address space 47 may be performed as peer-to-peer data transfer or as direct memory access (DMA) data transfer, so as not to consume computational resources of GFTL 40 (e.g. without accessing processor element 410A of FIG. 4 and without consuming memory space of memory element 410B of FIG. 4).

GFTL, 40 may continue or repeat the process of reading data of PBAs into read memory address space 46 and copying valid, non-expired data therefrom to write address space 47 until the amount of copied data in write memory address space 47 reaches a predefined threshold (e.g. when the amount of copied data content reaches the size, or storage capacity of a WU or until a subsequent data object may not be accommodated within the remaining write memory address space 47.

According to some embodiments, when the amount of data content (e.g., content of valid, non-expired data objects) copied to the write address space reaches the predefined threshold as elaborated herein, GFTL 40 may store the content of write memory address space 47 on the NVM storage device in one or more PBAs that may be represented by LBAs of the WU pointed by the write pointer 41. Thus, GFTL 40 may manage storage of received one or more data objects 20 on PBAs of the storage media 30, based on the determined status of expiration. In other words, GFTL 40 may manage storage of received one or more data objects 20 in a sense that GFTL 40 may determine that one or more data objects may be purged from storage media 30, based on the elapsed time since reception and/or storage of the one or more received data objects 20.

As elaborated herein, GFTL 40 may be configured to perform garbage collection from a first WU pointed by GC pointer 42 to a second WU pointed by write pointer 41. The GC process may be performed by copying content of valid data pages of the first WU (e.g., from data pages of PBAs that are represented by LBAs included in the first WU) to the second WU (e.g., to data pages of PBAs that are represented by LBAs included in the second WU). According to some embodiments, GFTL 40 may subsequently mark the first WU as empty (e.g., in metadata table 431), thus marking one or more respective PBAs of the first WU as empty.

GFTL 40 may further manage storage of received one or more data objects 20 on PBAs of the storage media 30 by erasing empty PBAs (e.g., by employing a background erasure process), as known in the art. In other words, GFTL 40 may manage storage of one or more data objects 20 on one or more NVM devices 31 by swiping, purging or evicting of data objects 20 that are:

non-valid (e.g., that have been rewritten, deleted or updated); and/or expired (e.g., having the real-world time represented by TTL elapsed).

Figure 10:
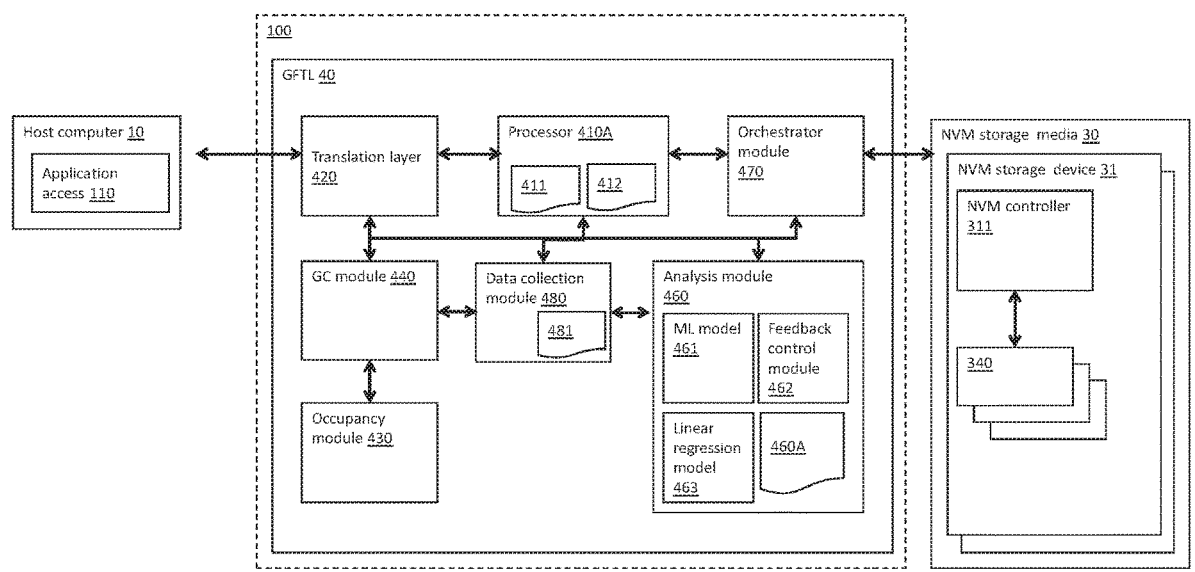
FIG. 10 is a block diagram, depicting content of a GFTL, which may be part of a system for managing data storage on non-volatile memory devices, according to some embodiments.

Reference is now made to FIG. 10, which depicts a Global Flash Translation Layer (GFTL) 40 that may be part of a system for managing data storage on non-volatile memory devices, according to some embodiments. It should be known that GFTL 40 may include additional components, as included herein in relation to other figures, that have been omitted from FIG. 10 for the purpose of clarity. Accordingly, the elaboration of at least part of the function of these components will not be repeated here, for the purpose of brevity.

As elaborated herein, GFTL 40 may:

monitor one or more performance parameters 481 of storage system 100;

assess the required OP ratio, in view of one or more target performance parameter values 411, based on the monitored information; and expand or shrink the reserved memory space of one or more NVM devices 31, to dynamically, in real-time or near real time, maintain a minimal OP ratio that may accommodate the one or more target performance parameter values 411.

According to some embodiments, the at least one processor 410A may be configured to receive at least one target value 411 of one or more performance parameters or QoS. For example, processor 410A may receive the at least one target value 411 from a user (e.g., a human administrator and/or a computing device), via an input device such as element 7 of FIG. 1. In another example, processor 410A may receive the at least one target value 411 from a software process that may be run or executed the at least one processor 410A.

The one or more target performance parameter values 411 may include, for example one or more of:

a number of NVM devices 31 included in the NVM storage media 30 a maximal target average read latency for at least one NVM device 31;

a maximal target tail read latency for at least one NVM device 31;

a maximal target average write latency for at least one NVM device 31;

a maximal target tail write latency for at least one NVM device 31;

a maximal target WA ratio for at least one NVM device 31;

a minimal, expected read-access rate (e.g., a number of read-access input and/or output operations per second (IOPS)) for at least one NVM device 31;

a minimal, expected write-access rate (e.g., a number of write-access IOPS) for at least one NVM device 31; and a minimal target endurance (e.g., a minimal life-time expectancy) for at least one NVM device 31.

Alternately, or additionally, NVM storage media 30 may store data respective to volumes (e.g., volumes that may pertain to specific users or clients) and may be stored for example in a storage space of NVM media 30 that may spread across one or more storage devices 31. Accordingly, one or more target performance parameter values 411 may pertain to data volumes, and may include for example:

a maximal target average read latency for at least one data volume stored on NVM media 30;

a maximal target tail read latency for at least one data volume stored on NVM media 30;

a maximal target average write latency for at least one data volume stored on NVM media 30;

a maximal target tail write latency for at least one data volume stored on NVM media 30;

a minimal, expected read-access rate (e.g., a number of read-access IOPS) for at least one data volume stored on NVM media 30; and a minimal, expected write-access rate (e.g., a number of write-access IOPS) for at least one data volume stored on NVM media 30.

GFTL 40 may include a data collection module 480, configured to accumulate and/or calculate, as elaborated herein, at least one run-time value 481 of one or more performance parameters pertaining to data access requests to one or more physical block addresses (PBAs) of the storage media. The one or more run-time parameter values may correspond to one or more respective target parameter values 411. Data collection module 480 may propagate the at least one run-time parameter value 481 to processor 410A which may in turn analyze the at least one run-time parameter value 481 as elaborated herein to ascertain a condition of storage system 40. Processor 410A may subsequently adjust or modify the number of reserved WUs in the logical address space, as elaborated in relation to FIG. 7 and hence change the OP ratio so as to accommodate a required target performance parameter value 411, as elaborated herein.

According to some embodiments, data collection module 480 may be associated with translation layer 420 (e.g., directly, or via processor 410A). Data collection module 480 may collect therefrom (e.g., repetitively or continuously over time), run time information pertaining to a plurality of data access requests (e.g., data read access requests and/or data write access requests). The run time information may include for example, a duration or latency (e.g., in CPU cycles and/or in real-time clock (RTC) units, as commonly referred in the art) of data access requests and a number of physical blocks (e.g., a number of PBAs) that have been accessed in each respective data access request.

Data collection module 480 may subsequently calculate or produce from the accumulated information one or more run-time performance parameter values 481, including for example:

a calculated average read latency, per a predefined block size (e.g., 4 kilo Bytes), for at least one NVM device 31 and/or for at least one data volume;

a calculated tail read latency (e.g., average latency of a top percentage of read access requests), per the predefined block size, for at least one NVM device 31 and/or for at least one data volume;

a calculated average write latency, per the predefined block size, for at least one NVM device 31 and/or for at least one data volume;

a calculated tail write latency (e.g., average latency of a top percentage of write access requests), per the predefined block size, for at least one NVM device 31 and/or for at least one data volume;

a frequency or rate of read-access requests for at least one NVM device 31 and/or for at least one data volume;

a frequency or rate of write-access requests for at least one NVM device 31 and/or for at least one data volume;

a throughput to load ratio (e.g., the amount of data sent to one or more computing devices 10 in relation to the amount of data requested to be read by the computing devices 10) for at least one NVM device 31 and/or for at least one data volume;

a read-to-write ratio (e.g., the number of received data access requests that are read-access requests in relation to write-access requests) for at least one NVM device 31 and/or for at least one data volume;

a data reduction ratio (e.g., a compression ratio such as a size of one or more stored, compressed data objects such as files in relation the size of the one or more data objects in their non-compressed form) for at least one NVM device 31 and/or for at least one data volume; and a number of skipped, occupied WUs (e.g., WUs that have been skipped by the GC process, as described herein) for at least one NVM device 31 and/or for at least one data volume.

Additionally, or alternatively, data collection module 480 may calculate or produce a run-time performance parameter value 481 that is a run-time WA ratio, for at least one NVM device 31. For example, data collection module 480 may be associated with GC module 440 (e.g., directly, or via processor 410A). Data collection module 480 may receive therefrom and/or monitor the amount of GC write actions performed to WUs pointed by write pointer 41, as elaborated herein in relation to FIGS. 4, 5A and 5B.

Data collection module 480 may calculate the actual, run-time WA ratio as elaborated herein, according to Eq. 1. In other words, data collection module 480 may calculate the total volume or amount of data (e.g., in WU units) written to NVM device 31 over a past predefined period of time (e.g., over the past hour, over the past day, etc.) as a sum of the amount of data (e.g., in WU units) written following external write-access requests (e.g., computing device 10, as received from translation layer 420) and the amount of data (e.g., in WU units) written to NVM device 31 by GC module 440 as part of garbage collection. Data collection module 480 may subsequently calculate the actual, run-time WA as a ratio between the calculated total amount of data written over the predefined period of time and the amount of data written following external write-access requests as elaborated herein in Eq. 1.

It should be noted that the inline management of GC by GC module 440 of GFTL 40 may provide an improvement over state-of-the-art storage systems, by providing a practical application for real-time or near real-time calculation of the actual, run-time WA ratio as part of the garbage collection process. The calculated run-time WA ratio may, in turn, be utilized to produce dynamic, minimal over-provisioning of reserved data storage space, as elaborated herein.

As elaborated herein, WA ratio may be calculated over time (e.g., over a past minute, hour, day, etc.), as elaborated in relation to Eq. 1 (e.g., as a ratio between the number of GC write accesses and a total number of write accesses). Additionally, or alternatively, run-time WA may be calculated or estimated in real time as part of the GC process (e.g., according to a distance between GC pointer 42 and write pointer 41, as elaborated herein).

The term minimal may be used in this context to indicate an over-provisioning ratio that may be sufficient to accommodate one or more target system performance parameter values 411, such as a maximal target WA ratio, and not affect the available or accessible storage space beyond that point.

Additionally, or alternatively, data collection module 480 may calculate or produce a run-time performance parameter value 481 that is a sequential write ratio, for at least one NVM device 31. For example, data collection module 480 may monitor the external write-access requests (e.g., from computing device 10, as received from translation layer 420), and calculate the sequential write ratio as a percentage of sequential write operations. For example, 0% may correspond to a completely random, sporadic, high entropy data write policy, whereas 100% may correspond to a completely sequential, low entropy data write policy.

Additionally, or alternatively, data collection module 480 may calculate or produce a run-time performance parameter value 481 that is a data reduction ratio. As known in the art, data received for storage on NVM media 30 via external write-access requests may be reduced, so as to enable storage of the received data on a reduced storage space. Such reduction may include for example compression of the received data, deduplication of data storage and the like. Such, and other methods for data reduction are well known in the art and will not be elaborated here for purpose of brevity.

Data collection module 480 may monitor the external write-access requests (e.g., from computing device 10, as received from translation layer 420), and calculate the data reduction ratio as a ratio between the actual amount of data (e.g., in WU units) that has been stored on physical blocks (e.g., in PBAs) of NVM media 30 (e.g., following data reduction such as compression and/or de-duplication) and the amount of data (e.g., in WU units) that has been included within the external write-access requests.

It should clarified that one or more target performance or QoS parameters and/or one or more run-time parameters may be associated with or correspond to one or more specific volumes or namespaces, as commonly referred to in the art, and may not be necessarily associated with one or more specific NVM devices 31 and/or specific storage blocks (e.g., elements 340 of FIGS. 3A and 3B). For example, an application (e.g., element 110 of FIGS. 3A and 3B) may access one or more data structures such as volumes, namespaces, data structures and the like, as known in the art. The one or more data structures (e.g., volumes) may be physically stored on one or more storage devices 31, in a sequential or non-sequential order. The one or more target performance or QoS parameters and/or one or more run-time parameters (e.g., target average read latency and/or run-time average read latency) may thus relate to at least one of the data structures (e.g., volumes), and GFTL 40 may optimize the OP so as to accommodate system performance, in relation to one or more target performance parameter values 411 associated with the at least one data structure (e.g., volume).

According to some embodiments, processor 410A may further receive (e.g., from computing device and/or an administrative user, via input element 7 of FIG. 1) one or more system-inherent parameter values 412 that may characterize storage system 100. For example, the one or more system-inherent parameter may include:

an inherent OP, e.g., a portion or percentage of storage address space that may be inherently exposed (e.g., by NVM controller 311) to a user and/or application (e.g., executed on computing device 10);

a maximal read access rate (e.g., in IOPS units) that may be supported by one or more NVM storage devices 31;

a maximal write access rate (e.g., in IOPS units) that may be supported by the one or more NVM storage devices 31;

a minimal read access average and/or tail latency that the one or more NVM storage devices 31 may guarantee; and a minimal write access average and/or tail latency that the one or more NVM storage devices 31 may guarantee.

According to some embodiments, GFTL 40 may include an analysis module 460 that may be associated with processor 410A. For example, analysis module 460 may be implemented a software module, as a hardware module or any combination thereof and may be executed by or controlled by at least one processor 410A as known in the art.

Analysis module 460 may be configured to receive as input at least one data element pertaining to: an actual, run-time performance parameter value 481; a target performance or QoS parameter value 411; and a system-inherent parameter value 412, as elaborated herein.

Analysis module 460 may analyze the received input (e.g., the at least one run-time performance parameter value 481) to obtain or calculate an optimal OP ratio value 460A for at least one NVM storage device 31 and/or volume, in view of the received at least one target performance parameter value 411 and/or system inherent parameter value 412, as elaborated herein.

The term 'optimal' may be used in the context of selection of an OP value in a sense that it may accommodate one or more requirements as manifested by respective one or more target parameter values 411 (e.g., a run-time read-access latency value that may be required to be below a maximal target read-access latency value, etc.) and also provide maximal accessible memory space on one or more storage devices 31. In other words, an optimal selection of an OP value may be a minimal OP that may facilitate at least one target parameter value 411. It should be noted that various metrics of optimization may be used as known to persons skilled in the art. Such metrics may include for example, a metric of combined weighted sums for one or more target parameters and/or for the accessible memory space, where at least one target parameter and or the accessible memory space may be attributed (e.g., by a user via input 7 of FIG. 1) a weight according to a respective importance or prevalence in the selection of the OP parameter, and the like.

As shown in FIG. 10, GFTL 40 may include an orchestrator module 470 that may be associated (e.g., directly or via processor 410A) with analysis module 460, translation layer 420, occupancy module 430 and/or GC module 440. Orchestrator module 470 may be configured to receive at least one of:

the calculated optimal OP ratio 460A from analysis module 460;

one or more indications of WUs of the logical address space 450 as occupied or unoccupied, from occupancy module 430 as elaborated in relation to FIG. 4.

Orchestrator module 470 may calculate a portion of WUs of the logical address space that should be reserved, according to the obtained optimal OP ratio 460A (e.g., as a percentage of the overall number of WUs that is equivalent to the OP ratio 460A). Orchestrator 470 may subsequently mark one or more WUs of the logical address space as reserved or as non-reserved, as elaborated in relation to FIG. 7, according to the calculated portion, so as to limit mapping of UBA to LBAs within reserved WUs according to the determined OP ratio 460A (e.g., according to the reservation of WUs).

This limitation of mapping of UBAs to LBAs may prevent storage of data objects by external write requests to PBAs that are associated with LBAs of the reserved WUs and may hence limit storage of data objects on the at least one NVM storage device 31 according to the determined, calculated OP ratio value 460A.

Orchestrator module 470 may calculate the number of WUs of the logical address 450 that should be marked as reserved according to the calculated optimal OP 460A (e.g., as their portion from the total number of WUs associated with a specific NVM storage device 31).

If the calculated number of WUs of the logical address 450 that should be marked as reserved exceeds the current number of WUs marked as reserved by a predefined margin, orchestrator module 470 may mark additional WUs as reserved, so as to further limit access to physical blocks of NVM device 31.

Additionally, or alternately, orchestrator module 470 may avoid marking occupied. WUs (as indicated by occupancy module 430) as reserved, so as to avoid the need to transfer data stored on respective PBAs of NVM device 31 elsewhere (e.g., to PBAs associated with LBAs of other WUs). The term 'avoid' may be used in this context to imply that when presented with a non-occupied WU and an occupied WU, orchestrator module 470 may choose to mark the non-occupied WU as reserved.

In the case in which orchestrator module 470 may mark an additional WU as reserved, one or more of the PBAs associated with LBAs of the newly reserved WU may still be in use and may hold data that may have been stored following an external write request (e.g., stored by computing device 10). To provide access to this data, GFTL may, move the data stored therein to one or more PBAs associated with LBAs that are included in non-reserved WUs.

In other words, when GC pointer 42 arrives at a newly reserved WU, GC module 440 may perform GC as elaborated herein, so as to read valid data stored on respective PBAs and write or move the read data to one or more PBAs that are associated with LBAs that are included in a non-reserved WU (e.g., a non-reserved WU pointed by write pointer 41).

If the calculated number of WUs of the logical address 450 that should be marked as reserved is below the current number of WUs marked as reserved by a predefined margin, orchestrator module 470 may mark some of the WUs as unreserved, thus permitting access to PBAs of the NVM device 31 that are associated with the now unreserved WUs.

As elaborated herein, GFTL 40 may avoid mapping UBAs to LBAs that are included in WUs marked as reserved and may thus disallow write access to PBAs of the NVM media, that are represented by one or more LBAs comprised in the marked one or more WUs.

Analysis module 460 may analyze the received at least one run-time performance parameter value 481 repeatedly, so as to calculate or obtain a timewise dynamic, optimal OP ratio value 460A, in view of at least one change in at least one of a target performance parameter value 411 and a run-time performance parameter value 481.

For example, if a data access policy is changed (e.g., data write access become more sporadic and less sequential), data collection module 480 may detect the change, and calculate a modified (e.g., a lower) value for the sequential write ratio. Analysis module 460 may re-analyze the received run-time performance data, and may calculate or produce a modified (e.g., a higher) optimal OP ratio value 460A. Orchestrator module 470 may relate to the modified optimal OP ratio 460A by marking additional WUs as reserved, and GFTL 40 may thus reserve additional memory space to provide the minimal over-provisioning and accommodate the required target QoS or performance parameter values 411. In a complementary manner, if the write access becomes more sequential, analysis module 460 may dynamically change the OP value 460A, orchestrator 470 may subsequently decrease the number of reserved WUs and GFTL 40 may thus dynamically provide access to a larger portion of the memory space of NVM device 31.

In another example, if a run-time read-access tail latency value is changed (e.g., increased beyond a target read-access tail latency value), data collection module 480 may calculate the changed value, and indicate the change (e.g., when the change surpasses a predefined threshold) to analysis module 460. Analysis module 460 may re-analyze the received run-time performance data, including the changed read-access tail latency value and may calculate or produce a modified (e.g., a higher) optimal OP ratio 460A. GFTL 40 may subsequently change the OP (e.g., increase the number of reserved WUs) to alleviate the retrieval of stored data objects, and decrease the run-time read-access tail latency value.

In a complementary manner, if one or more run-time performance parameter values 481 may become within predefined respective target performance parameter value ranges 411 (e.g., the run-time WA ratio performance parameter value 481 may become lower than the target value 411 of the maximal WA ratio, the run-time average read latency may become lower than the target maximal read latency value, etc.) analysis module 460 may re-analyze the received run-time performance data, including the changed performance parameter value 481, and may calculate or produce a modified (e.g., a lower) optimal OP ratio 460A. GFTL 40 may subsequently change the OP (e.g., orchestrator 470 may decrease the number of reserved WUs) to allow access to a larger portion of the storage device's storage space.

In yet another example, processor 410A may receive (e.g., from an administrative user) one or more data elements pertaining to a change in at least one target performance parameter value 411 and/or system-inherent parameter value 412. Analysis module 460 may subsequently re-analyze the received run-time performance data in view of the change and may calculate a modified value of the optimal OP 460A that may accommodate the changed target requirement.

Analysis module 460 may receive from processor 410A a changed target performance parameter value 411 such as required extended minimal target endurance (e.g., extended lifetime expectancy) of NVM device 31 and may also receive from data collection module 480 the run-time value of the data write-access rate and run-time value of the current WA ratio. As known in the art, the lifetime expectancy of the NVM device is normally given as a function of the number of programming cycles by the NVM device's manufacturer. Given the run-time value of the data write-access rate, analysis module 460 may calculate the maximal allowed WA ratio that would accommodate the required extended life expectancy. If the actual run-time WA value as calculated by data collection module 480 exceeds the calculated maximal allowed WA ratio, analysis module 460 may calculate a modified OP ratio that would sufficiently reduce the run-time WA (e.g., to be lower than the maximal allowed WA ratio).

In some embodiments OP value 460A may be calculated and changed iteratively, while monitoring the influence of the changed OP value on that of one or more run-time performance parameter values 481, until an optimal OP value 460A may be reached.

For example, as elaborated herein in relation to Eq. 3, calculation or estimation of the WA ratio may be based on the number of one or more LBAs marked as reserved (or as the ratio of reserved LBAs from the total memory space, as presented in Eq. 3). Pertaining to the example of the maximal allowed WA ratio elaborated above, as a first iteration, analysis module 460 may set the OP value 460A according to Eq. 3, as discussed herein: $WA=[(1/OP)+OP]/2$. From that point, GFTL 40 may set the OP value 460A iteratively:

data collection module 480 may calculate an updated run-time WA value;

analysis module 460 may calculate an updated OP value 460A;

orchestrator module 470 may mark an updated number of WUs as reserved;

GFTL 40 may apply the reservation restriction on data access to NVM device 31;

and vice versa, until at least one required target performance parameter value 411 (e.g., in this case the maximal allowed WA ratio and hence the life expectancy of NVM device 31) is met.

According to some embodiments, analysis module 460 may be configured to collect or accumulate a plurality of values of one or more run-time performance parameter values 481 over time and determine an optimal OP ratio of at least one NVM storage device according to the accumulated plurality of run-time performance parameter values 481. For example, analysis module 460 may continuously and/or repetitively analyze one or more run-time performance parameters 481, and their relation to over-provisioning (OP) values over time. Pertaining to the same example of the maximal allowed WA ratio elaborated above, each change made to the OP ratio at each iteration, and each respective subsequent change made to one or more run-time performance parameter 481 (e.g., in this case the run-time WA) may be monitored and stored (e.g., in a database such as storage element 6 of FIG. 1). Additionally, or alternatively, one or more run time parameter values may be sampled over time (e.g., every minute over a day) and stored (e.g., in a database). The accumulated data may be utilized by analysis module 460 to understand the relation between OP values and specific run-time performance parameter values 481 and to provide an optimal OP value 460A in view of a required one or more target performance parameter values 411, as elaborated herein.

According to some embodiments of the invention, analysis module 460 may include one or more optimization models, as elaborated herein. Analysis module 460 may provide at least one run time performance parameter value 481 as a first data input to the one or more optimization models and may provide at least one of a target parameter value 411 and a system-inherent parameter value 412 as a second data input to one or more optimization models. Analysis module 460 may obtain from the one or more optimization models an optimal OP ratio 460A of the least one NVM storage device, as elaborated herein.

According to some embodiments of the invention, the one or more optimization models may be or may include a machine learning (ML) based model 461. For example, ML based model 461 may be or may include a neural network (NN).

The term neural network, e.g. a neural network implementing machine learning, may refer herein to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

ML model may be adapted to receive at least one of: (a) a received target parameter value 411 (e.g., a target WA value, a target average read-access latency, etc.) and/or (b) a system-inherent parameter value 412 (e.g., a read-access latency that may be inherent to NVM storage device 31) as a first data input.

ML model 461 may be adapted to receive at least one run-time performance parameter value 481 (e.g., a run-time WA value, a run-time average read-access latency, etc.) as a second data input.

ML model 461 may be trained to obtain or calculate an optimal OP ratio of at least one NVM storage device 31 according to the at least one first data input and second data input (e.g., in view of at least one of the target parameter value 411 and the system-inherent parameter value 412).

For example, as known in the art, ML model 461 may be trained during an initial training stage and may be operatively utilized in GFTL 40 at a later, inference stage. During the training stage, ML model 461 may be supervised by one or more run-time performance parameter values 481 (e.g., as calculated by data collection module 480) as known in the art to learn or predict an optimal OP value in view of one or more target performance parameter values 411. At the inference stage, ML model 461 may receive at least one run-time performance parameter value 481 as a data input and produce an optimal OP value based on the ML model 461 training.

Additionally, or alternatively, the one or more optimization models may be or may include a feedback control module 462. Feedback control module 462 may be adapted to receive at least one of: (a) a received target parameter value 411 (e.g., a target WA value, a target average read-access latency, etc.) and/or (b) a system-inherent parameter value 412 (e.g., a read-access latency that may be inherent to NVM storage device 31) as a first data input.

Feedback control module 462 may be adapted to receive at least one run-time performance parameter value 481 (e.g., a run-time WA value, a run-time average read-access latency, etc.) as a second, feedback data input, and may repeatedly produce or emit an OP value 460A to orchestrator module 470 based on at least one of:
the received target parameter value 411;
the system-inherent parameter value 412; and
the feedback input, as elaborated herein.

The term repeatedly may be used in this context to indicate that feedback control module 462 may produce an OP value at several occurrences, for example at a predefined time interval, in response to a change in the input data and/or in response to a request by processor 410A, and the like.

As known to persons skilled in the art of control theory, feedback control module 462 may receive the at least one run-time performance parameter value 481 as closed-loop feedback, representing a condition of storage system 100, in view of the produced OP value. Feedback control module 462 may thus produce an optimal OP value based on or according to the first input (e.g., a target value of a performance parameter 411) and second input (e.g., real-time or measured value of the performance parameter 481).

For example, when a real-time or measured value 481 of WA exceeds a target value 411 of WA beyond a first predefined threshold, feedback control module 462 may increase the OP value. In a complementary manner, when a real-time or measured value 481 of WA is below a target value 411 of WA by a margin that exceeds a second predefined threshold, feedback control module 462 may decrease the OP value 460A.

Additionally, or alternatively, the one or more optimization models may be or may include any model or data structure as known in the art, that may be adapted to provide an minimal or optimal OP ratio value 460A, so as to accommodate at least one requirement for a target value 411 of a performance parameter, as elaborated herein. For example, the one or more optimization models may be or may include a linear regression model 463, adapted to generate or produce a minimal or optimal OP ratio value 460A, that may accommodate one or more requirements relating to one or more target performance parameter values 411 (e.g., data access tail latency beneath a first predefined limit, data access average latency beneath a second predefined limit and the like).

As elaborated herein in relation to FIGS. 5A and 5B, PBAs of the storage media 30 may be represented by respective LBAs in a logical address space 450 and the LBAs may be organized in WUs, wherein each WU comprises one or more LBAs. GFTL 40 may perform a GC process that may include:

setting cyclic GC pointer 42 to point to a first WU of the logical address space;

setting the cyclic write pointer 41 to point to a second WU of the logical address space;

reading content of valid data from one or more PBAs that are represented by respective one or more LBAs of the first WU (e.g., pointed by GC pointer 42);

writing the read data content to one or more PBAs represented by respective one or more LBAs of the second WU (e.g., pointed by write pointer 41); and advancing pointers 41 and 42 in a cyclic order, as elaborated herein.

As elaborated herein in relation to FIGS. 6A, 6B and 6C, pointers 41 and 42 are advanced or incremented in a sequential cyclic order, where write pointer 41 follows GC pointer 42. According to experimental results, the distance between the cyclic GC pointer and the cyclic write pointer affects the ratio between user write operations and GC write operations.

For example, a small distance may require a GC mechanism to increase the number of WUs that need to be prepared for writing (e.g., "garbage collected"). Therefore, a small distance tends to increase the portion of GC write operations from the total number NVM write operations and increase the write amplification (WA). In a complementary manner, a large distance tends to decrease the portion of GC write operations from the total number NVM write operations and decrease the WA. Therefore, the distance between pointers 41 and 42 may provide a real-time indication of the WA ratio.

According to some embodiments, GC module 440 may be configured to calculate or estimate the run-time WA ratio based on the distance between the WU pointed by the GC pointer 42 and the WU pointed by the write pointer 41.

It may be emphasized that such computation of run-time WA ratio, based on real time values of pointers 41 and 42 may be substantially immediate, and may not require accumulation over time of information pertaining to the amount of data written by external write access requests (e.g., from computing device 10) and the amount of data written by the GC process. Hence, calculation of run-time WA ratio based on the distance between pointers 41 and 42 may be utilized by analysis module 460 to calculate an optimal or minimal OP 460A, based on real-time WA ratio calculation.

Additionally, or alternately, GC module 440 may be configured to calculate the run-time WA ratio based on the distance between the WU pointed by the GC pointer 42 and the WU pointed by the write pointer 41, and further based on the number of one or more WUs marked as reserved.

For example, embodiments of the invention may periodically (e.g., at a predefined time interval, such as every minute, hour etc.) calculate WA as explained in relation to Eq. 1 and accumulate or maintain the calculations in a database (e.g., element 6 of FIG. 1). Embodiments may also accumulate at least one of: the distance between the WU pointed by the GC pointer 42 and the WU pointed by the write pointer 41 and the number of one or more WUs marked as reserved at the same timing. Embodiments may subsequently use the accumulated data to estimate or calculate WA in real time, according to real-time distance between the GC pointer 42 and the write pointer 41 and the number of one or more WUs marked as reserved.

Figure 11:
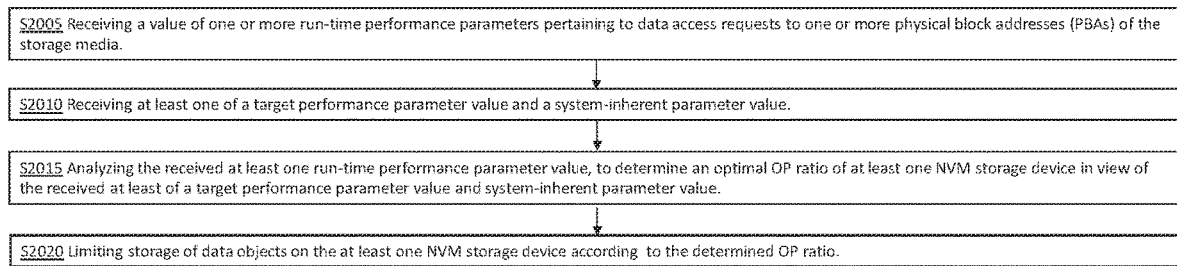
FIG. 11 is a flow diagram, depicting a method of managing over-provisioning on non-volatile memory computer storage media that may include at least one NVM storage device, by at least one processor, according to some embodiments.

Reference is now made to FIG. 11, which depicts a flow diagram, elaborating a method of managing over-provisioning on non-volatile memory computer storage media (e.g., element 30 of FIG. 10) comprising at least one NVM storage device (e.g., element 31 of FIG. 10), by at least one processor (e.g., element 410A of FIG. 10), according to some embodiments.

As shown in step 2005, the at least one processor 410A may receive a value of one or more run-time performance parameters 481 pertaining to data access requests to one or more physical block addresses (e.g., PBA elements of FIG. 5A, and FIG. 5B) of storage media 30.

As shown in step 2010, the at least one processor 410A may receive at least one of a target performance parameter value 411 and a system-inherent parameter value 412. As elaborated herein, the one or more run-time performance parameter value 481 may correspond to at least one of the target performance parameter value 411 and system-inherent parameter value 412. For example, a target performance parameter value 411 may be a maximal permitted value of write amplification (WA), and a run-time performance parameter value 481 may be a measured or calculated run time value of WA, in real-time or near real-time.

As shown in step 2015, the at least one processor 410A may analyze the received at least one run-time performance parameter value, to determine an optimal OP ratio of at least one NVM storage device in view of the received at least of a target performance parameter value and system-inherent parameter value. As elaborated herein the OP ratio may be optimal in a sense that it may accommodate the one or more requirements of target performance parameter values 411, while allowing maximal accessible volume of storage on NVM device 31 and/or NVM media 30.

As shown in step 2020, the at least one processor 410A may limit storage of data objects on the at least one NVM storage device according to the determined OP ratio. For example, the at least one processor 410A may limit access to one or more WUs of the logical address space 450 by labeling them as 'Reserved', as elaborated herein in relation to FIG. 7.

Embodiments of the invention provide an improvement over state-of-the-art data storage systems by facilitating a practical application for evicting or purging expired, cached data objects, while avoiding additional read amplification, write amplification, code complexity overhead and/or network overloading, as elaborated herein.

As elaborated herein, embodiments may store TTL data in conjunction with respective data objects on NVM storage media 30, and manage cache storage operations (e.g., manage purging or eviction of stored, expired data elements) therefrom at the GC level (e.g., at a level that may directly relate to the physical storage media). Such implementation may provide an improvement over state-of-the-art caching systems that may manage caching at an application level, such as an application that may be executed on a remote host computer (e.g., such as element 10 of FIG. 2). Thus, embodiments of the invention may require reduced computational, communicational and/or structural overhead in comparison to state-of-the-art caching systems.

As explained herein, state-of-the-art data storage systems may be configured to reserve a minimal portion of the underlying memory space to accommodate a minimal predefined OP ratio. However, state-of-the-art data storage systems do not provide dynamic management of the OP ratio.

Thus, embodiments of the invention may provide an improvement over state-of-the-art data storage systems by providing an optimal, dynamic OP ratio value. The OP ratio may be optimal in a sense that it may accommodate one or more requirements (e.g., QoS requirements) for the storage system's performance (e.g., storage access mean latency, storage access tail latency, write amplification, etc.) and yet maintain a maximal volume of accessible storage available for users and/or computing systems. The OP ratio may be dynamic in a sense that it may change due to changing conditions in real-time (e.g., due to a change in the storage system's workload) and/or due to a change in at least one target performance parameter.

Moreover, embodiments of the invention may provide an improvement over state-of-the-art storage systems, by providing a practical application for real-time or near real-time calculation of an actual, run-time WA ratio as part of a garbage collection process. The calculated run-time WA ratio may, in turn, be utilized to dynamically determine a minimal over provisioning ratio, as elaborated herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of managing over-provisioning (OP) on non-volatile memory (NVM) computer storage media comprising at least one NVM storage device, by at least one processor, the method comprising:
   receiving a value of one or more run-time performance parameters pertaining to data access requests to one or more physical block addresses (PBAs) of the storage media, wherein the PBAs are represented by respective logical block addresses (LBAs) in a logical address space and wherein the LB As are organized in write units (WUs);
   receiving at least one of a target performance parameter value and a system-inherent parameter value;
   analyzing the received at least one run-time performance parameter value, to determine an optimal OP ratio of at least one NVM storage device in view of the received at least of a target performance parameter value and system-inherent parameter value;
   calculating a portion of WUs of the logical address space that should be reserved, according to the obtained optimal OP ratio;
   marking one or more WUs as reserved, according to the calculation; and
   disallowing write access to PBAs of the NVM media, that are represented by one or more LBAs comprised in the marked one or more WUs.

2. The method of claim 1, wherein analyzing the received at least one run-time performance parameter value comprises:
   accumulating a plurality of values of the one or more run-time performance parameters over time; and
   determining an optimal OP ratio of at least one NVM storage device according to the accumulated plurality of run-time performance parameter values.

3. The method of claim 1, wherein analyzing the received at least one run-time performance parameter value is performed repeatedly, so as to obtain a timewise dynamic, optimal OP ratio value, in view of at least one change in at least one of a target performance parameter value and a run-time performance parameter value.

4. The method of claim 1 wherein the value of at least one run-time performance parameter is selected from a list consisting of: a write amplification (WA) ratio, a sequential write ratio, a read average latency, a read tail latency, a write average latency, a write tail latency, a data reduction ratio, a frequency of read access requests, a frequency of write access requests, a read to write ratio and a throughput to load ratio.

5. The method of claim 1 wherein the value of at least one target performance parameter is selected from a list consisting: a minimal expected read access rate, a minimal expected write access rate, a maximal target average read latency, a maximal target tail read latency, a maximal target average write latency, a maximal target write tail latency, a maximal target WA ratio, a minimal target endurance for at least one NVM device, a maximal target average read latency for at least one data volume, a maximal target tail read latency for at least one data volume, a maximal target average write latency for at least one data volume and a maximal target tail write latency for at least one data volume.

6. The method of claim 1, wherein analyzing the received at least one run-time performance parameter value comprises:
   providing the received at least one performance parameter value as a first data input to an optimization model;
   providing at least one of a target parameter value and a system-inherent parameter value as a second data input to the optimization model; and
   obtaining from the optimization model the optimal OP ratio of the least one NVM storage device.

7. The method of claim 6, wherein the optimization model is a machine-learning (ML) model, trained to produce an optimal OP ratio of the at least one NVM storage device in view of at least one of the target parameter value and the system-inherent parameter value.

8. The method of claim 6, wherein the optimization model is a feedback control module, adapted to receive the at least one performance parameter value as feedback input and produce an optimal OP ratio of the at least one NVM storage device based on at least one of:
   the received target parameter value;
   the system-inherent parameter value; and
   the feedback input.

9. The method of claim 4, wherein receiving a value of the run-time WA ratio comprises calculating the run-time WA ratio in real time, as part of a garbage collection (GC) process.

10. The method of claim 1, wherein each WU comprises one or more LBAs.

11. The method of claim 8, wherein the GC process comprises one or more of:
   a. setting a GC pointer to point to a first WU of the logical address space;
   b. setting a write pointer to point to a second WU of the logical address space;
   c. reading content of valid data from one or more PBAs that are represented by respective one or more LBAs of the first WU;
   d. writing the read content to one or more PBAs represented by respective one or more LBAs of the second WU; and
   e. calculating the run-time WA ratio based on a distance between the WU pointed by the GC pointer and the WU pointed by the write pointer.

12. The method of claim 9, wherein calculating the run-time WA ratio is further based on the number of one or more WUs marked as reserved.

13. The method of claim 9, further comprising:
   updating at least one pointer value of the GC pointer value and the write pointer value, so as to point to a subsequent WU in the logical address space, in a sequential, cyclical order; and
   repeating the GC process with the updated at least one pointer value.

14. A system for managing over-provisioning (OP) on NVM computer storage media comprising at least one non-volatile memory (NVM) storage device, the system comprising a non-transitory memory device, wherein modules of instruction code are stored, and a processor associated with the memory device, and configured to execute the modules of instruction code, whereupon execution of said modules of instruction code, the processor is further configured to perform at least one of:
   receive a value of one or more run-time performance parameters pertaining to data access requests to one or more physical block addresses (PBAs) of the storage media, wherein the PBAs are represented by respective logical block addresses (LBAs) in a logical address space and wherein the LBAs are organized in write-units (WUs);
   receive at least one of a target performance parameter value and a system-inherent parameter value; analyze the received at least one run-time performance parameter value, to determine an optimal OP ratio of at least one NVM storage device in view of the received at least of a target performance parameter value and system-inherent parameter value;
   calculate a portion of WUs of the logical address space that should be reserved, according to the obtained optimal OP ratio;
   mark one or more WUs as reserved, according to the calculation; and
   disallow write access to PBAs of the NVM media, that are represented by one or more LBAs comprised in the marked one or more WUs.

15. The system of claim 14, wherein the processor is further configured to:
   accumulate a plurality of values of the one or more run-time performance parameters over time; and
   determine an optimal OP ratio of at least one NVM storage device according to the accumulated plurality of run-time performance parameter values.

16. The system of claim 14, wherein the processor is further configured to analyze the received at least one run-time performance parameter value repeatedly, so as to obtain a timewise dynamic, optimal OP ratio value, in view of at least one change in at least one of a target performance parameter value and a run-time performance parameter value.

17. The system of claim 14 wherein the value of at least one run-time performance parameter is selected from a list consisting of: a WA ratio, a sequential write ratio, a read average latency, a read tail latency, a write average latency, a write tail latency, a data reduction ratio, a frequency of read access requests, a frequency of write access requests, a read to write ratio and a throughput to load ratio.

18. The system of claim 14 wherein the value of at least one target performance parameter is selected from a list consisting: a minimal expected read access rate, a minimal expected write access rate, a maximal target average read latency, a maximal target tail read latency, a maximal target average write latency, a maximal target write tail latency, a maximal target WA ratio, a minimal target endurance for at least one NVM device, a maximal target average read latency for at least one data volume, a maximal target tail read latency for at least one data volume, a maximal target average write latency for at least one data volume and a maximal target tail write latency for at least one data volume.

19. The system of claim 14, wherein the processor is further configured to:
   provide the received at least one performance parameter value as a first data input to an optimization model;
   provide at least one of a target parameter value and a system-inherent parameter value as a second data input to the optimization model; and
   obtain from the optimization model the optimal OP ratio of the least one NVM storage device.

20. The system of claim 19, wherein the optimization model is a ML model, trained to produce an optimal OP ratio of the at least one NVM storage device in view of at least one of the target parameter value and the system-inherent parameter value.

21. The system of claim 19, wherein the optimization model is a feedback control module, adapted to receive the at least one performance parameter value as feedback input and produce an optimal OP ratio of the at least one NVM storage device based on at least one of:
   the received target parameter value;
   the system-inherent parameter value; and
   the feedback input.

22. The system of claim 17, wherein receiving a value of the run-time WA ratio comprises calculating the run-time WA ratio in real time, as part of a GC process.

* * * * *